(12) United States Patent
Ko et al.

(10) Patent No.: US 11,145,951 B2
(45) Date of Patent: Oct. 12, 2021

(54) ANTENNA DEVICE AND ELECTRONIC DEVICE HAVING SAME

(71) Applicant: Samsung Electronics Co., Ltd., Gyeonggi-do (KR)

(72) Inventors: Seung-Tae Ko, Gyeonggi-do (KR); Yoon-Geon Kim, Seoul (KR); Sang-Ho Lim, Gyeonggi-do (KR); Won-Bin Hong, Seoul (KR)

(73) Assignee: Samsung Electronics Co., Ltd

( * ) Notice: Subject to any disclaimer, the term of this patent is extended or adjusted under 35 U.S.C. 154(b) by 492 days.

(21) Appl. No.: 15/767,542

(22) PCT Filed: Nov. 10, 2016

(86) PCT No.: PCT/KR2016/012939
§ 371 (c)(1),
(2) Date: Apr. 11, 2018

(87) PCT Pub. No.: WO2017/082652
PCT Pub. Date: May 18, 2017

(65) Prior Publication Data
US 2018/0287243 A1    Oct. 4, 2018

(30) Foreign Application Priority Data

Nov. 10, 2015 (KR) .................. 10-2015-0157760

(51) Int. Cl.
*H01Q 1/24* (2006.01)
*H01Q 1/27* (2006.01)
(Continued)

(52) U.S. Cl.
CPC ............. *H01Q 1/241* (2013.01); *H01Q 1/273* (2013.01); *H01Q 1/38* (2013.01); *H01Q 5/30* (2015.01);
(Continued)

(58) Field of Classification Search
CPC .................................................. H01Q 1/2208
See application file for complete search history.

(56) References Cited

U.S. PATENT DOCUMENTS 7,847,753 B2 * 12/2010 Ishibashi .............. H01Q 9/0407
343/897
9,209,513 B2 * 12/2015 Ely .......................... C23C 14/16
(Continued)

FOREIGN PATENT DOCUMENTS

CN        1426256       6/2003
CN        102263323     11/2011
(Continued)

OTHER PUBLICATIONS

Chinese Office Action dated Jun. 2, 2020 issued in counterpart application No. 201680065447.4, 22 pages.
(Continued)

*Primary Examiner* — Ab Salam Alkassim, Jr.
(74) *Attorney, Agent, or Firm* — The Farrell Law Firm, P.C.

(57) ABSTRACT

One example among various examples of the present invention provides an antenna device and an electronic device having the same, and the antenna device can comprise: a conductive film member including mesh grid areas composed of transparent conducting wires and electrodes; and a radiation pattern path unit formed between the mesh grid areas. In addition, the antenna device and the electronic device having the same, according to the present invention, can be implemented through other various examples.

11 Claims, 20 Drawing Sheets

(51) Int. Cl.
    *H01Q 1/38*     (2006.01)
    *H01Q 5/30*     (2015.01)
    *H04B 5/00*     (2006.01)
    *H01Q 7/00*     (2006.01)
    *H04M 1/02*     (2006.01)

(52) U.S. Cl.
    CPC ............ *H04B 5/0025* (2013.01); *H01Q 7/00* (2013.01); *H04M 1/0202* (2013.01); *H04M 1/026* (2013.01)

(56) References Cited

U.S. PATENT DOCUMENTS

| | | | | |
|---|---|---|---|---|
| 9,692,113 | B2* | 6/2017 | Pope | H01Q 1/38 |
| 9,870,493 | B2* | 1/2018 | Yashiro | G06K 7/10247 |
| 10,326,196 | B2* | 6/2019 | Kim | H01Q 15/006 |
| 10,411,353 | B2* | 9/2019 | Sugita | H01Q 9/0407 |
| 10,474,282 | B2* | 11/2019 | Park | G06F 1/1647 |
| 10,622,703 | B2* | 4/2020 | Hong | H01Q 1/44 |
| 10,819,007 | B2* | 10/2020 | Yashiro | H04B 5/0031 |
| 10,910,718 | B2* | 2/2021 | Yashiro | H01Q 1/243 |
| 2009/0051620 | A1* | 2/2009 | Ishibashi | H01Q 1/243 343/897 |
| 2011/0298670 | A1* | 12/2011 | Jung | H01Q 1/243 343/702 |
| 2012/0146857 | A1* | 6/2012 | Wang | H01Q 1/2258 343/702 |
| 2013/0099994 | A1 | 4/2013 | Yosui | |
| 2014/0104157 | A1* | 4/2014 | Burns | H01Q 1/44 345/156 |
| 2014/0106684 | A1* | 4/2014 | Burns | H01Q 21/28 455/78 |
| 2014/0154980 | A1* | 6/2014 | Jang | H04B 5/0087 455/41.1 |
| 2014/0206419 | A1* | 7/2014 | Wang | H01Q 5/335 455/575.7 |
| 2014/0218262 | A1 | 8/2014 | Tsubaki | |
| 2014/0247188 | A1 | 9/2014 | Nakano et al. | |
| 2015/0009623 | A1* | 1/2015 | Ryu | H01Q 7/00 361/679.55 |
| 2015/0255856 | A1* | 9/2015 | Hong | H01Q 9/0407 343/702 |
| 2016/0093939 | A1* | 3/2016 | Kim | H01Q 1/243 343/720 |
| 2016/0210615 | A1* | 7/2016 | Lee | G06K 7/10356 |
| 2016/0241306 | A1* | 8/2016 | Moon | H01Q 1/2208 |
| 2016/0261026 | A1* | 9/2016 | Han | H01Q 9/04 |
| 2016/0261314 | A1* | 9/2016 | Cox | H04B 17/21 |
| 2016/0365620 | A1* | 12/2016 | Que | H01Q 1/2266 |
| 2017/0344766 | A1* | 11/2017 | Yashiro | G06K 7/10316 |
| 2017/0352959 | A1* | 12/2017 | Sugita | H01Q 1/2266 |
| 2017/0373397 | A1* | 12/2017 | Yashiro | H01Q 9/0407 |
| 2019/0261521 | A1* | 8/2019 | Suzuki | H05K 1/0296 |
| 2019/0372196 | A1* | 12/2019 | Aso | H01Q 7/00 |

FOREIGN PATENT DOCUMENTS

| | | |
|---|---|---|
| CN | 103905095 | 7/2014 |
| KR | 1020050056810 | 6/2005 |
| KR | 1020110080023 | 7/2011 |
| KR | 101098263 | 12/2011 |
| KR | 1020150002314 | 1/2015 |
| KR | 101554129 | 9/2015 |

OTHER PUBLICATIONS

Chinese Office Action dated Sep. 4, 2019 issued in counterpart application No. 201680065447.4, 18 pages.

PCT/ISA/210 Search Report issued on PCT/KR2016/012939 (pp. 3).

PCT/ISA/237 Written Opinion issued on PCT/KR2016/012939 (pp. 9).

\* cited by examiner

ANTENNA DEVICE AND ELECTRONIC DEVICE HAVING SAME

PRIORITY

This application is a National Phase Entry of PCT International Application No. PCT/KR2016/012939, filed on Nov. 10, 2016, and claims priority to Korean Patent Application No. 10-2015-0157760, filed on Nov. 10, 2015, the contents of each of which are incorporated herein by reference.

BACKGROUND

1. Field

Various embodiments disclosed herein relate to an electronic device, and more particularly, to an antenna device for implementing a wireless communication function and an electronic device having the antenna device.

2. Description of Related Art

Wireless communication techniques have recently been implemented in various schemes (e.g., a wireless Local Area Network Communication (w-LAN) that are represented by the Wi-Fi technique, Bluetooth, and Near Field Communication (NFC)), in addition to a commercialized mobile communication network connection. Mobile communication services have evolved from a first-generation mobile communication service, which is centered on voice communication, to a fourth-generation mobile communication network, enabling Internet and multimedia services. Next-generation mobile communication services, which will be commercialized in the future, are expected to be provided in a very high frequency band of several tens of GHz or more.

As communication standards, such as NFC and Bluetooth, have become active, electronic devices (e.g., a mobile communication terminal) have been equipped with antenna devices that operate in various different frequency bands. For example, fourth-generation mobile communication services are operated in the frequency bands of, for example, 700 MHz, 1.8 GHz, and 2.1 GHz, Wi-Fi is operated in the frequency bands of 2.4 GHz and 5 GHz although there are some differences depending on the protocol rule, and Bluetooth is operated in the frequency band of 2.45 GHz.

In order to provide stable service quality in a commercialized wireless communication network while increasing the wireless communication and data transmission speed with various external devices, an antenna device of an electronic device should satisfy a high gain and a wide radiation area (beam coverage). The next generation mobile communication services will be provided in a high frequency band of several tens of GHz or more and may require higher performance than that of the antenna devices, which have been used in the previously commercialized mobile communication services. For example, a radio signal has a characteristic that the higher the frequency band of the radio signal is, the faster the transmission of a large amount of information. However, the higher the frequency band is, the stronger the directivity of the radio signal becomes, which makes the radio signal more susceptible to being reflected or blocked by an obstacle and the signal arrival distance is reduced.

In addition, it is possible to transmit and receive radio signals of various frequency bands by mounting a plurality of antenna modules, and it is possible to speed up data transmission at the time of transmission and reception. However, the number of antenna modules is inevitably limited due to the limitation of the mounting space of the antenna module. In an electronic device such as a mobile communication terminal that is miniaturized for a portable purpose, it is difficult to secure a mounting space and position for ensuring the stable performance of antenna modules.

As described above, electronic devices are required to transmit a large amount of data faster, while being changed in size and shape to limit the mounting space and mounting position of antenna devices of various frequency bands.

In addition, as described above, there is a need for an antenna device having a wide gain and a wide radiation area in the next generation wireless communication service for data transmission with various external devices. Furthermore, it is difficult to secure an antenna device capable of ensuring stable transmission and reception performance in a very high frequency band in an electronic device equipped with various antenna devices for Wi-Fi, Bluetooth, and proximity wireless communication as well as mobile communication services.

SUMMARY

Accordingly, the present disclosure provides an antenna device capable of being equipped with an antenna device having various frequencies through various embodiments and having a high gain and a wide radiation area. The present disclosure also provides an electronic device having the antenna device.

In addition, the present disclosure provides an antenna device capable of having different frequency bands in a miniaturized electronic device through various embodiments and capable of forming a strong magnetic field in a limited display panel. The present disclosure also provides an electronic device having the antenna device.

Further, the present disclosure provides an antenna device capable of being implemented in various ways within a display unit, which is capable of covering various frequency bands.

According to various embodiments, an antenna device may include a transparent film member, and a transparent coil member provided on at least one face of the transparent film member. The transparent coil member may include a first transparent coil member having a first frequency band, and a second transparent coil member disposed along a periphery of the first transparent coil member, and having at least one second frequency band that is different from the first frequency band.

According to various embodiments, an antenna device may include a transparent film member, and a transparent coil member provided on at least one face of the transparent film member. The transparent coil member may include a transparent coil portion wound in one direction on at least one face of the transparent film member, and a plurality of terminal sections configured to share the transparent coil portion, and to input/output current to/from the transparent coil portion for a first frequency band and at least one second frequency band which is different from the first frequency band.

According to various embodiments, an electronic device may include a display including a display region and a non-display region, a transparent film member provided as at least one panel of the display, and an antenna device disposed in the display region and the non-display region.

The antenna device may include a transparent film member, and a transparent coil member provided on at least one face of the transparent film member. The transparent coil member may include a first transparent coil member having a first frequency band, and a second transparent coil member disposed along a periphery of the first transparent coil member, and having at least one second frequency band that is different from the first frequency band.

In addition, according to various embodiments, an electronic device may include a display including a display region and a non-display region, and an antenna device provided as at least one panel of the display, and disposed in the display region and the non-display region. The antenna device may include a transparent film member, and a transparent coil member provided on at least one face of the transparent film member. The transparent coil member may include a transparent coil portion wound in one direction on at least one face of the transparent film member, and a plurality of terminal sections configured to share the transparent coil portion, and to input/output current to/from the transparent coil portion for a first frequency band and at least one second frequency band which is different from the first frequency band.

With an antenna device according to various embodiments and an electronic device having the antenna device, it is possible to implement an antenna device having different frequency bands over a display region and a non-display region of the display.

In addition, with an antenna device according to various embodiments and an electronic device having the antenna device, since it is possible to dispose an antenna module in a display region and a non-display region of a display, an antenna module mounting space can be secured, and since an antenna pattern or the like is formed inside the display, it is possible to transmit radio frequency signal and data in various bands according to a radiation pattern and a setting thereof.

In addition, with an antenna device according to various embodiments and an electronic device having the antenna device, since a plurality of antenna devices can be mounted inside the electronic device, transmission and reception of various radio frequency bands are enabled, and transmission speed in radio transmission and reception speed for transmission of data or the like can be increased.

Further, an antenna device according to various embodiments and an electronic device having the antenna device can be provided with an antenna module for short-range wireless communication in a folded or overlapped manner in a display area or a non-display area of the display.

BRIEF DESCRIPTION OF THE DRAWINGS

The above and other aspects, features and advantages of the present disclosure will be more apparent from the following detailed description taken in conjunction with the accompanying drawings, in which.

Figure 1:
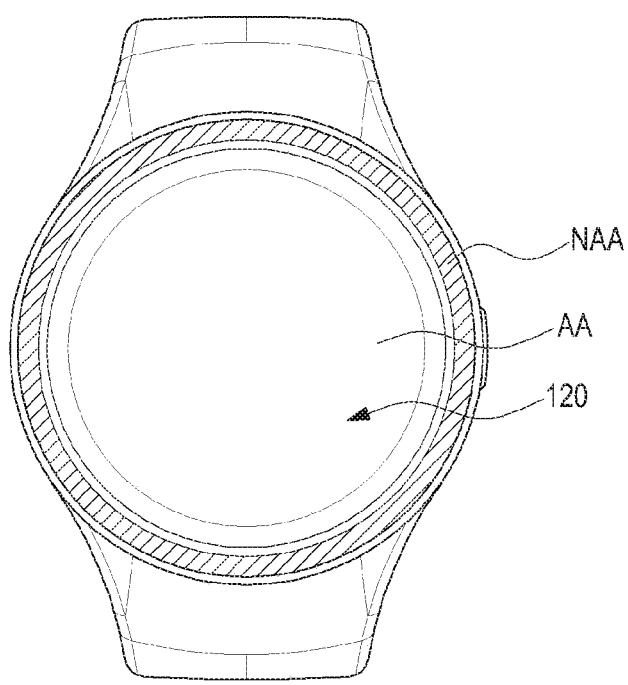
FIG. 1 is a view schematically illustrating an electronic device according to various embodiments.

| Reference Numeral | |
|---|---|
| 100, 200: Display unit | 110, 210: Glass panel |
| 120, 220: Touch panel | 130, 230: TFT-array |
| 140, 240: Lower panel | 121, 252: Radiation pattern path portion |
| 250: Antenna panel portion | 125, 255: Power feeding unit |
| 126, 256: Transmission line portion | 160, 260: Substrate portion |
| 300: Display unit | 310: Glass |
| 320: Touch panel | 350: Antenna device |

DETAILED DESCRIPTION

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/ or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Figure 2:
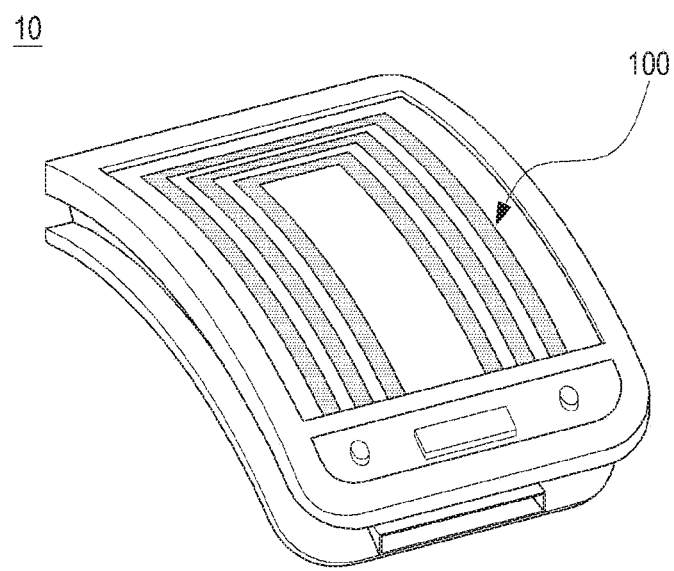
FIG. 2 is a view illustrating an antenna device provided in an electronic device according to various embodiments.

FIG. 1 is a view schematically illustrating an electronic device 10 according to various embodiments. FIG. 2 is a view illustrating an antenna device 100 provided in an electronic device 10 according to various embodiments.

Referring to FIGS. 1 and 2, an electronic device 10 according to one embodiment may include a display 20, a housing 30, and an antenna device 100.

According to one embodiment, the display 20 may be disposed on the front face portion of the electronic device 10, and may be exposed on one face of the housing 30. The display 20 may include a display region AA in which a screen is displayed and a non-display region NAA in which no screen is displayed.

The display region AA may include a touch panel. Thus, it is possible to perform input/output functions, such as sensing a touch and displaying a screen. The display region AA may have various shapes. For example, a circular shape, an elliptical shape, or a polygonal shape, such as a triangle or a rectangle.

According to one embodiment, the non-display region NAA may be formed on at least a part of the edge of the display region AA. The non-display region NAA is a region where a signal transmission line, a circuit board unit, or the like may be disposed, and may be formed to be opaque through printing, coating, or the like, so that these structures can be shielded to be invisible.

At least one face of the display 20 may be provided with a transparent glass, so that the display 20 can be protected and the display region AA of the display 20 can be displayed to be visible to the outside. The window may be coupled to the display 20 by an adhesive member, for example, an Optically Clear Adhesive (OCA) film.

In order to implement an image, input, or the like, the display 20 may have a structure in which a plurality of modules, for example, a backlight unit, a glass panel, a touch panel, etc., are stacked. In addition, a transparent film member 110 may be stacked on the display 20, and may include a transparent coil member 140 capable of implementing different frequency bands to be described later in the display region AA or the non-display region NAA.

According to various embodiments, the display 20 may be mounted on the front face of the housing 30 and a battery or the like may be mounted on the rear face of the housing 30. Modules, such as display 20 bracket and a printed circuit board may be disposed inside the housing 30.

Recently, it is proposed that an electronic device 10 be miniaturized, slimmed down, and reduced in weight so as to be easily portable or easily worn on a user's body. Thus, there is a limit in the space in which various modules can be mounted inside the housing 30. Accordingly, the antenna device 100 according to various embodiments may be disposed not only in the non-display region NAA of the display 20, but also in the display region AA. In addition, according to various embodiments, the antenna device 100 may include two or more different frequency bands, which may be disposed inside the electronic device 10, for example, at the positions of the display region AA and the non-display region NAA of the display 20.

According to various embodiments, the antenna device 100 may be configured as a coil type. In addition, in the antenna device 100 according to various embodiments, one coil may be shared so as to implement different frequency bands, or may be separated into different coils so as to implement different frequency bands. In addition, in the antenna device 100 according to various embodiments, coils may be formed in a single layer so as to implement different frequency bands, or may be formed in multiple layers on different faces so as to implement different frequency bands.

According to various embodiments, the antenna device 100 may include a transparent film member 110 (see FIG. 3) and a transparent coil member 140.

The transparent film member 110 is a single panel stacked on the display 20, and may be disposed on the upper face or the lower face of the touch panel.

The transparent coil member 140 may be provided on at least one face of the transparent film member 110, and may be provided to implement two or more different frequency bands. For example, as will be disclosed later, the transparent coil members 140 may be provided in a single layer on one face of the transparent film member 110, and may be separated from each other so as to implement different frequency bands therethrough. Alternatively, a single transparent coil member 140 may be shared so as to implement different frequency bands. In addition, as will be disclosed later, the transparent coil members 140 may be respectively disposed on the upper and lower faces of the transparent film member 110 and the transparent coil members 140 mounted on the upper and lower faces of the transparent film member 110 may be separated from each other so as to implement different frequency bands. Alternatively, different frequency bands can be implemented by sharing a single transparent coil member 140 on the upper and lower faces of the transparent coil member 140.

First, it can be said that the transparent coil members 140 are provided on the transparent film member 110 in such a manner that the transparent coils 140 are separated from each other and are provided in a single layer on the same face of the transparent coil member 140, so that different frequency bands can be implemented.

Figure 3:
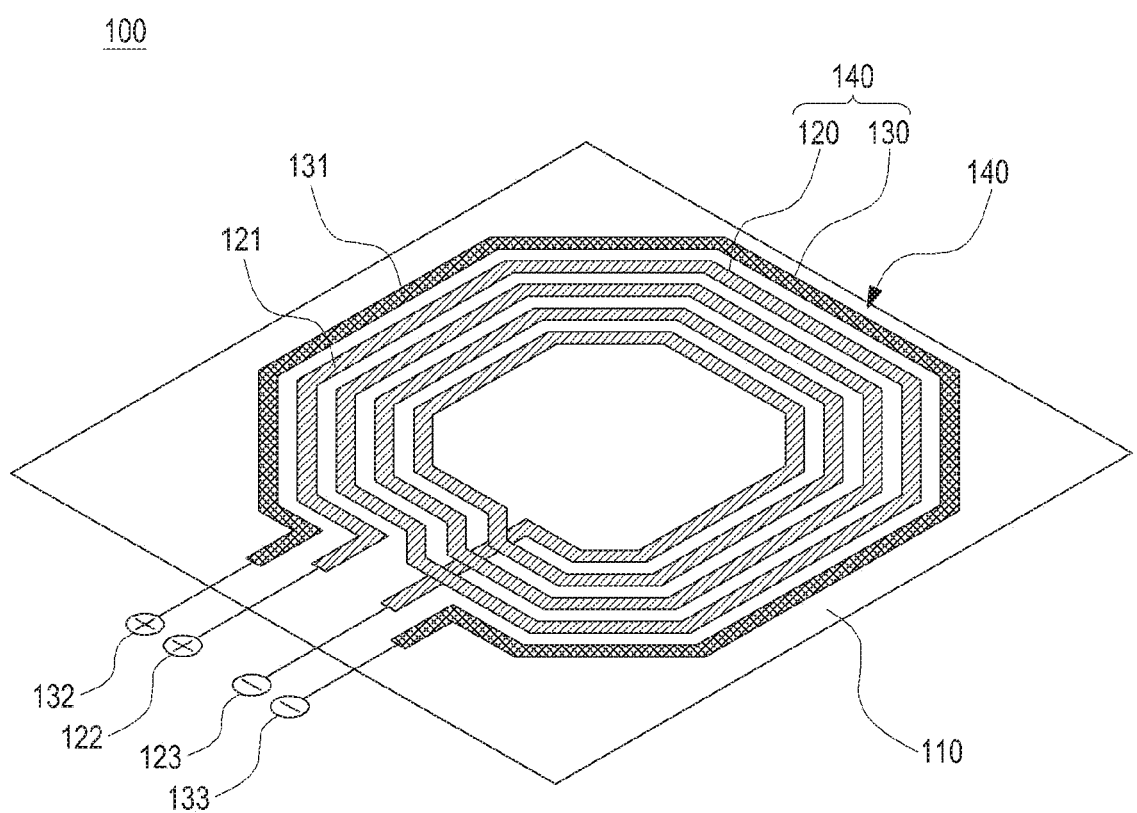
FIG. 3 is a view illustrating an antenna device according to one embodiment in an electronic device according to various embodiments.
Figure 4:
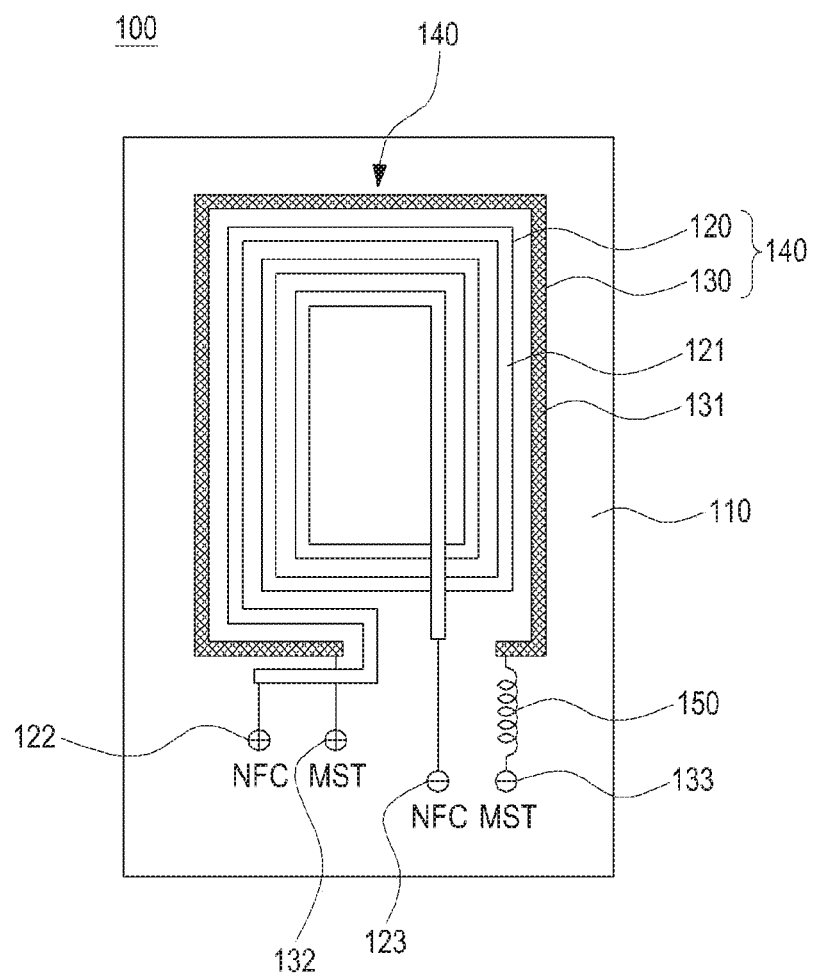
FIG. 4 is a schematic view illustrating an antenna device according to one embodiment in an electronic device according to various embodiments.
Figure 5:
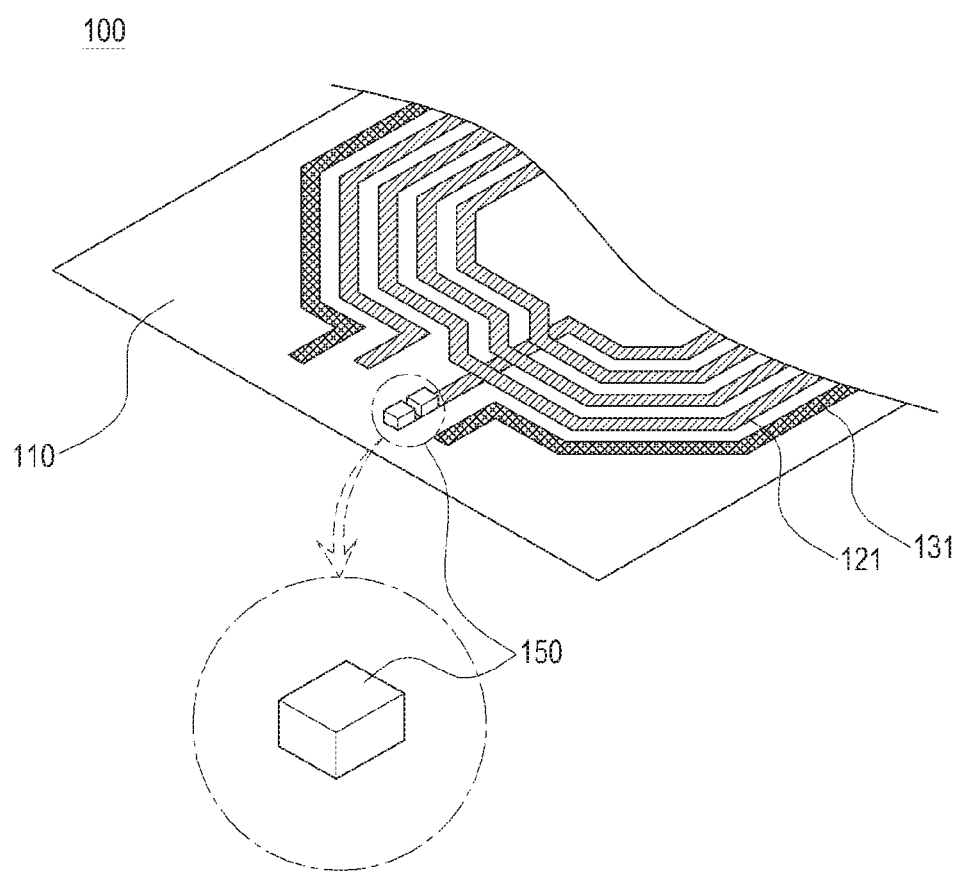
FIG. 5 is a view illustrating a part of an antenna device according to one embodiment in the electronic device according to various embodiments.

FIG. 3 is a view illustrating an antenna device 100 according to one embodiment in the electronic device 10 according to various embodiments. FIG. 4 is a schematic view illustrating an antenna device 100 according to one embodiment in the electronic device 10 according to various embodiments. FIG. 5 is a view illustrating a part of an antenna device 100 according to one embodiment in the electronic device 10 according to various embodiments.

Referring to FIGS. 3 to 5, according to various embodiments, the transparent coil member 140 may be provided in a single layer on one face of the transparent film member 110, and may include a first transparent coil member 120 and a second transparent coil member 130.

The first transparent coil member 120 may be provided to implement the first frequency band.

The second transparent coil member 130 may be disposed along the periphery of the first transparent coil member 120 and may include a second frequency band which is different from (at least higher than) the first frequency band.

In various embodiments, the first transparent coil member 120 may be made for, for example, Near Field Communication (NFC) having a first frequency band, and the second transparent coil member 130 may made for, for example, Magnetic Secure Transmission (MST) having a second frequency band, which is different from that of the NFC having the first frequency band.

According to various embodiments, the first transparent coil member 120 may include a first coil portion 121, a first input terminal 122, and a first output terminal 123, and the second transparent coil member 130 may include a second coil portion 131, a second input terminal 132, and a second output terminal 133.

The first coil portion 121 may be provided to be wound in at least one direction on one face of the transparent film member 110 and at least one of the opposite ends of the first coil portion 121 may be provided with the first input terminal 122, and the remaining one of the opposite ends of the first coil portion 121 may be provided with the first output terminal 123.

The first input terminal 122 may be provided at one end of the first coil portion 121 and may be disposed adjacent to the second input terminal 132 to be described later. The first input terminal 122 may be provided to allow a current to be input to the first coil portion 121 so as to implement the first frequency band.

The first output terminal 123 may be provided at the remaining end of the first coil portion 121 and may be provided such that the current input to the first input terminal 122 can be moved and output from the first coil portion 121. The first output terminal 123 may be disposed adjacent to the second output terminal 133.

The second coil portion 131 may be wound in one direction on at least one face of the transparent film member 110 and may be wound along the periphery of the coil wound on the outermost side of the first coil portion 121 in such a manner that the second coil portion 131 encloses the first coil portion 121. At least one of the opposite ends of the second coil portion 131 may be provided with a second input terminal 132 and the remaining one of the opposite ends of the second coil portion 131 may be provided with a second output terminal 133.

The second input terminal 132 and the second output terminal 133 may be respectively provided at the opposite ends of the second coil portion 131 and may be disposed adjacent to each other. In addition, the second input terminal 132 may be disposed adjacent to the first input terminal 122, and the second output terminal 133 may be disposed adjacent to the first output terminal 123. The second input terminal 132 may be provided at one end of the second coil portion 131 such that current is input to the second coil portion 131 therethrough.

The second output terminal 133 may be provided at the other end of the second coil portion 131 and may be provided so as to output the current input to the second coil portion 131 through the second input terminal 132.

In addition, a lumped element (e.g., an L element) 150 may be disposed on the first output terminal 123 side or the second output terminal 133 side so as to compensate for inductance. According to various embodiments, as an example, it may be described that the lumped element may be configured with an L element and may be provided on the second transparent coil member 130 made of MST, specifically, on the second output terminal 133 side.

Hereinafter, as an example, it may be described that transparent coil members 240 may be provided on the transparent film member 210, and the transparent coil members 240, which are separated from each other in order to implement different frequency bands, may be provided in multiple layers on different faces of the transparent film member 210.

Figure 6:
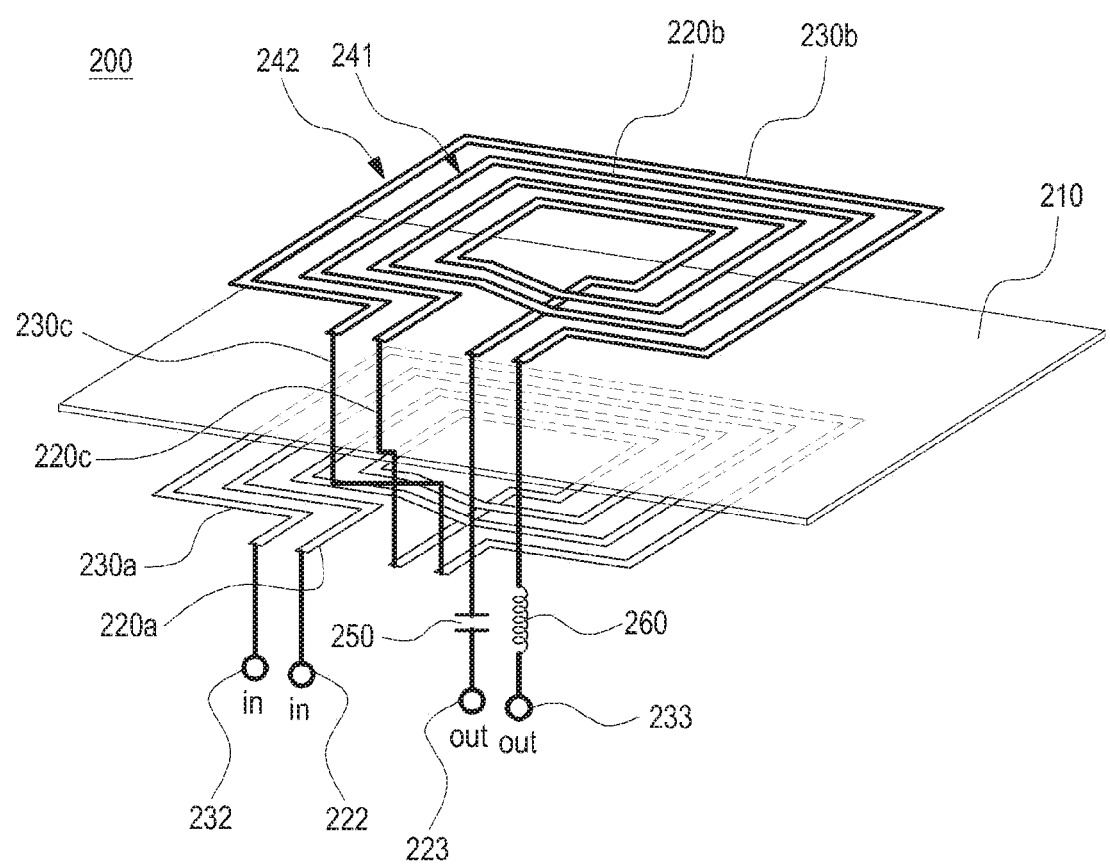
FIG. 6 is a view illustrating a structure of an antenna device according to one embodiment in an electronic device according to various embodiments.
Figure 7:
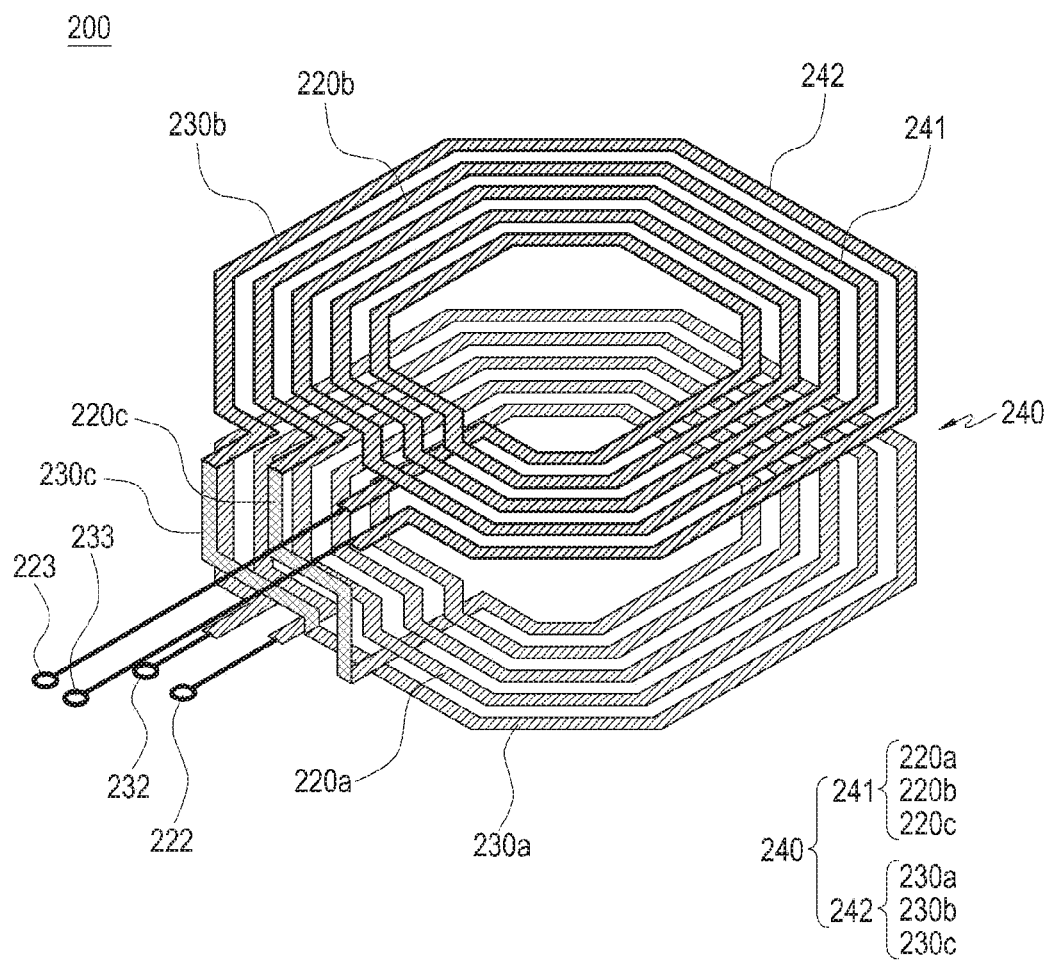
FIG. 7 is a view schematically illustrating an antenna device according to one embodiment in an electronic device according to various embodiments.

FIG. 6 is a view illustrating a structure of an antenna device 200 according to one embodiment in the electronic device 10 according to various embodiments. FIG. 7 is a view schematically illustrating an antenna device 200 according to one embodiment in the electronic device 10 according to various embodiments.

Referring to FIGS. 6 and 7, according to various embodiments, the transparent coil member 240 may be provided in multiple layers on the opposite faces of the transparent film member 210, and may include a first transparent coil member 220 and a second transparent coil member 230.

The first transparent coil member 220 may be wound on one face and the other face (also referred to as "another surface") opposite to the one face of the transparent film member 210, and may be provided to implement a first frequency band.

The second transparent coil member 230 may be disposed to be wound along the periphery of the first transparent coil member 220 on the opposite faces of the first transparent film member 210, and may include a second frequency band which is different from (at least higher than) the first frequency band.

In various embodiments, the first transparent coil member 220 may be made for, for example, Near Field Communication (NFC) having a first frequency band, and the second transparent coil member 230 may made for, for example, Magnetic Secure Transmission (MST) having a second frequency band, which is different from that of the NFC.

As described above, the first transparent coil member 220 according to various embodiments may be connected to each of the opposite faces of the transparent film member 210, may be wound on the opposite faces of the first transparent film member 210, and may be provided so as to implement the first frequency band.

According to various embodiments, the first transparent coil member 220 may include a first coil portion 220a, a second coil portion 220b, a first input terminal 222, a first output terminal 223, and a first connection portion 220c.

The first coil portion 220a may be wound in at least one direction on one face of the transparent film member 210 and at least one of the opposite ends of the first coil portion 220a may be connected to the second coil portion 220b, which is wound on the opposite faces of the transparent film member 210 to be described later. That is, the first coil portion 220a and the second coil portion 220b may be connected to each other, but may be wound on different faces. In the present disclosure, as an example, it is described that the remaining one of the opposite ends of the first coil portion 220a is connected to the second coil portion 220b. However, the present disclosure is not limited thereto, and the connection form or structure between the first coil portion 220a and the second coil portion 220b can be freely modified or changed as long as the first coil portion 220a and the second coil portion 220b are connected to each other.

The second coil portion 220b may be wound in at least one direction on the opposite faces of the transparent film member 210, and at least one of the opposite ends of the second coil portion 220b may be connected to the remaining one of the opposite ends of the first coil portion 220a. In the present disclosure, as an example, it is described that one end of the second coil portion 220b is connected to the remaining one of the opposite ends of the first coil portion 220a. However, the present disclosure is not limited to this, and the connection form or structure between the first coil portion 220a and the second coil portion 220b can be freely modified or changed as long as the first coil portion 220a and the second coil portion 220b are connected to each other.

The first input terminal 222 and the first output terminal 223 may be respectively provided at the opposite ends of the second coil portion 220b and may be disposed adjacent to each other. For example, the first input terminal 222 may be connected to one of the first coil portion 220a and the second coil portion 220b such that current is input to the first coil portion 220a and the second coil portion 220b. According to various embodiments, as an example, it may be described that the first input terminal 222 is connected to one end of the first coil portion 220a. Accordingly, one end of the first coil portion 220a may be connected to the first input terminal 222 and the remaining end of the first coil portion 220a may be connected to the first connection portion 220c so as to be connected to the second coil portion 220b via the first connection portion 220c.

The first output terminal 223 is connected to the remaining one of the first coil portion 220a and the second coil portion 220b, which is not connected to the first input terminal 222, so as to output the current input to the first coil portion 220a and the second coil portion 220b via the first input terminal 222. According to various embodiments, as an example, it may be described that the first output terminal 223 is connected to the remaining end of the second coil portion 220b. Thus, one end of the second coil portion 220b may be connected to the remaining end of the first coil portion 220a via the first connection portion 220c and the remaining end of the second coil portion 220b may be connected to the first output terminal 223.

Also, as mentioned above, one of the opposite ends of the first coil portion 220a and one of the opposite ends of the second coil portion 220b may be connected to each other via the first connection portion 220c. According to the various embodiments, as an example, it may be described that the first connection portion 220c connects the remaining end of the first coil portion 220a and the one end of the second coil portion 220b. However, as mentioned above, the shapes, positions, structures, etc. of the first input terminal 222, the first output terminal 223, and the first connection portion 220c can be freely changed.

According to various embodiments, the first transparent coil member 220 may be configured such that the first coil portion 220a may be wound on one face of the transparent film member 210, the second coil portion 220b may be wound on the other face of the transparent film member 210, one end of the first coil portion 220a may be connected to the first input terminal 222, the remaining end of the first coil portion 220a may be connected to one end of the second coil portion 220b via the first connection portion 220c, and the remaining end of the second coil portion 220b may be connected to the first output terminal 223.

Thus, the current input via the first input terminal 222 may be input to the first coil portion 220a wound on one face of the transparent film member 210, may be input to the second coil portion 220b wound on the other face of the transparent film member 210 via the first connection part 220c, and may then be output via the first output terminal 223.

In addition, as described above, the second transparent coil member 230 may be disposed along the periphery of the first transparent coil member 220 to be connected to the opposite faces of the transparent film member 210. For example, the second transparent coil member 230 may include a third coil portion 230a, a fourth coil portion 230b, a second input terminal 232, a second output terminal 233, and a second connection portion 230c.

The third coil portion 230a may be disposed on one face of the transparent film member 210 so as to be wound around the outer periphery of the coil wound on the outermost side of the first coil portion 220a. One of the opposite ends of the third coil portion 230a may be connected to one of the second input terminal 232 and the second output terminal 233, via which current is input or output, and the remaining one of the opposite ends of the third coil portion 230a may be connected to the second connection portion 230c which is connected the fourth coil portion 230b, which is wound on the opposite faces of the transparent film member 210.

According to one embodiment, as an example, it may be described that one end of the third coil portion 230a may be connected to the second input terminal 232, and the remaining end of the third coil portion 230a may be connected to the second connection portion 230c. However, the configurations, structures, positions of the second input terminal 232 and the second connection portion 230c, which are respectively connected to the opposite ends of the third coil portion 230a can be freely modified or changed without being limited thereto. For example, the second output terminal 233 may be connected to one end of the third coil portion 230a and the second connection portion 230c may be connected to the remaining end of the third coil portion 230a.

The fourth coil portion 230b may be disposed on the opposite faces of the transparent film member 210 so as to be wound along the outer periphery of the coil wound on the outermost side of the second coil portion 220a. At least one end of the fourth coil portion 230b may be connected to one of the second input terminal 232 and the second output terminal 233, via which current is input or output, and the remaining end of the fourth coil portion 230b may be connected to the second connection portion 230c, which may be connected to the third coil portion 230a wound on a face, which is different from that on which the fourth coil portion 230b is wound.

According to various embodiment, as an example, it may be described that one end of the fourth coil portion 230b may be connected to the second connection portion 230c, and the remaining end of the fourth coil portion 230b may be connected to the second output terminal 233. However, the configurations, structures, positions of the second output terminal 233 and the second connection portion 230c, which are respectively connected to the opposite ends of the fourth coil portion 230b, can be freely modified or changed without being limited thereto. For example, one end of the fourth coil portion 230b may be connected to the second connection portion 230c, and the remaining end of the fourth coil portion 230b may be connected to the second input terminal 232.

The second input terminal 232 and the second output terminal 233 may be respectively provided at the opposite ends of the fourth coil portion 230b and may be disposed adjacent to each other. In addition, the second input terminal 232 may be disposed adjacent to the first input terminal 222, and the second output terminal 233 may be disposed adjacent to the first output terminal 223. For example, the second input terminal 232 may be connected to one of the third coil portion 230a and the fourth coil portion 230b such that current is input to the third coil portion 230a and the fourth coil portion 230b. According to various embodiments, as an example, it may be described that the second input terminal 232 is connected to one end of the third coil portion 230a. Accordingly, one end of the third coil portion 230a may be connected to the second input terminal 232 and the remaining end of the third coil portion 230a may be connected to the second connection portion 230c so as to be connected to the fourth coil portion 230b via the second connection portion 230c.

The second output terminal 233 is connected to the remaining one of the third coil portion 230a and the fourth coil portion 230b, which is not connected to the second input terminal 232, so as to output the current input to the third coil portion 230a and the fourth coil portion 230b via the second input terminal 232. According to various embodiments, as an example, it may be described that the second output terminal 233 is connected to the remaining end of the fourth coil portion 230b. Thus, one end of the fourth coil portion 230b may be connected to the remaining end of the third coil portion 230a via the second connection portion 230c and the remaining end of the fourth coil portion 230b may be connected to the second output terminal 233.

Also, as mentioned above, one of the opposite ends of the third coil portion 230a and one of the opposite ends of the fourth coil portion 230b may be connected to each other via the second connection portion 230c. According to the various embodiments, as an example, it may be described that the second connection portion 230c connects the remaining end of the third coil portion 230a and the one end of the fourth coil portion 230b. However, as mentioned above, the shapes, positions, structures, etc. of the second input terminal 232, the second output terminal 233, and the second connection portion 230c can be freely changed.

According to various embodiments, the second transparent coil member 230 may be configured such that the second coil portion 220b may be wound on one face of the transparent film member 210, the fourth coil portion 230b may be wound on the other face of the transparent film member 210, one end of the third coil portion 230a may be connected to the second input terminal 232, the remaining end of the third coil portion 230a may be connected to one end of the fourth coil portion 230b via the second connection portion 230c, and the remaining end of the fourth coil portion 230b may be connected to the second output terminal 233.

Thus, the current input via the second input terminal 232 may be input the third coil portion 230a wound on one face of the transparent film member 210, may be input to the fourth coil portion 230b wound on the other face of the transparent film member 210 via the second connection part 230c, and may then be output via the second output terminal 233.

In addition, lumped elements (e.g., L elements) 250 and 260 may be disposed on the first output terminal 223 side or the second output terminal 233 side so as to compensate for inductance. According to various embodiments, as an example, it may be described that the lumped elements 250 and 260 may be configured with L elements and may be provided on the second transparent coil member 230 made of MST, specifically, on the second output terminal 233 side.

In the above-described embodiments (FIGS. 3 to 9), as an example, it has been described that that two coils (the first transparent coil member 340 and the second transparent coil member 340) are separately provided in one layer or multiple layers in the transparent film member 310 in order to implement different frequency bands. Hereinafter, it may be described that the transparent coil member 340 may be provided in a single layer or multiple layers on the transparent film member 310 so as to implement different frequency bands, and may a single transparent coil member 340 may be shared so as to implement different frequency bands.

First, it may be described that according to various embodiments, in the antenna device 300, a single transparent coil member 340, which is formed in a single on the transparent film member 310, may be shared in order to implement different frequency bands.

Figure 8:
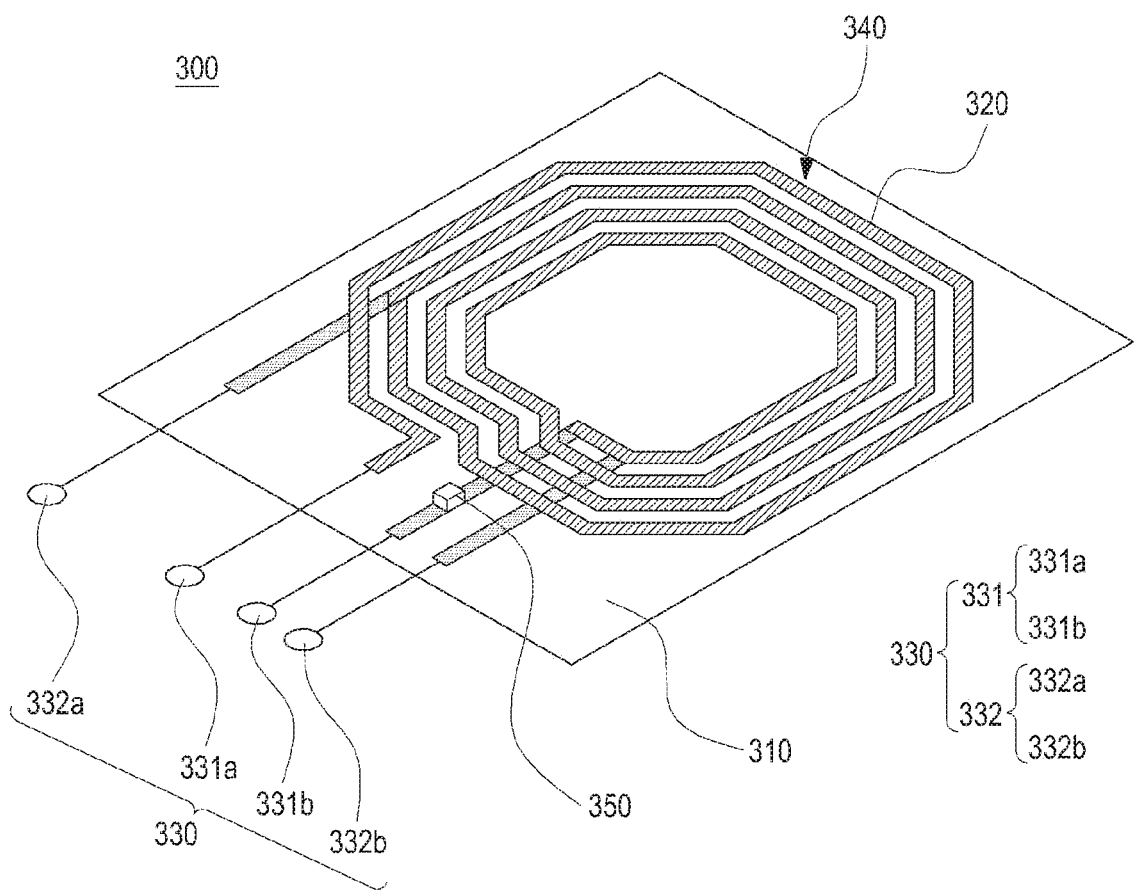
FIG. 8 is a view illustrating a structure of an antenna device according to one embodiment in an electronic device according to various embodiments.
Figure 9:
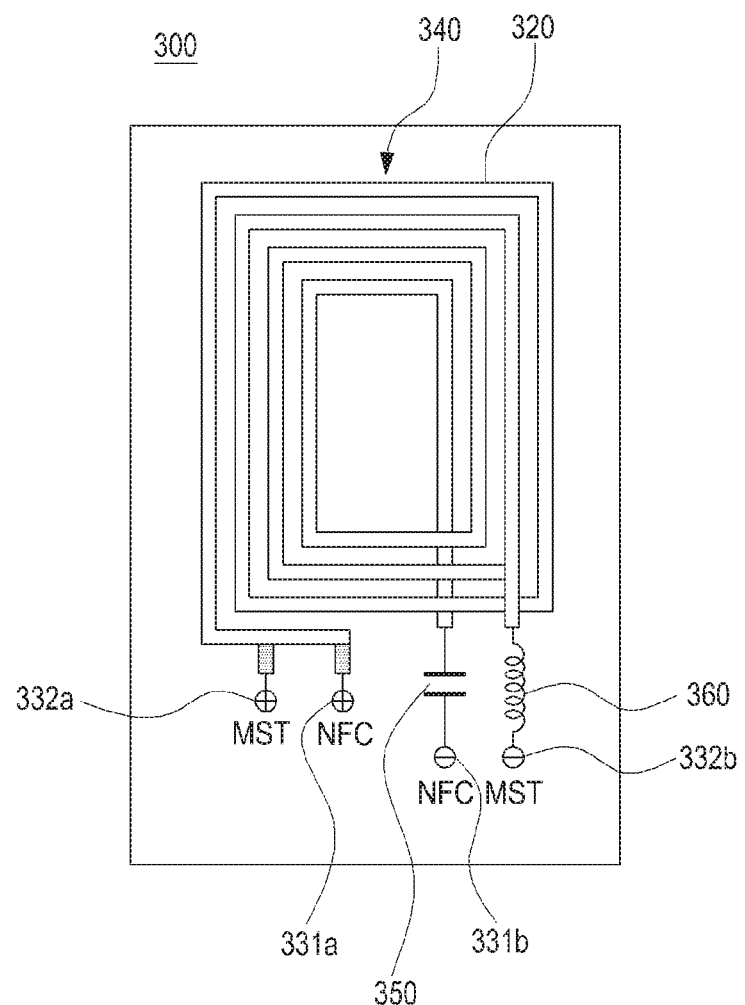
FIG. 9 is a view schematically illustrating an antenna device according to one embodiment in an electronic device according to various embodiments.

FIG. 8 is a view illustrating a structure of an antenna device 300 according to one embodiment in the electronic device 10 according to various embodiments. FIG. 9 is a view schematically illustrating an antenna device 300 according to one embodiment in the electronic device 10 according to various embodiments.

Referring to FIGS. 8 and 9, according to various embodiments, the antenna device 300 may include a transparent film member 310 and a transparent coil member 340.

The transparent film member 310 may be laminated on the top face or bottom face of a display, e.g., a touch panel. In addition, the transparent coil member 340 to be described later may be mounted on at least one of the opposite faces of the transparent film member 310 so as to implement two or more frequency bands.

The transparent coil member 340 may be provided in a single layer on one face of the transparent film member 310 and may include a transparent coil portion 320 and a terminal section 330.

The transparent coil portion 320 may be wound in one direction on at least one face of the transparent film member 310.

The terminal section 330, which includes a pair of terminals to input/output current to/from the transparent coil portion 320, may be connected to the transparent coil portion 320 so as to generate signals of a plurality of frequency bands (e.g., a first frequency band and a second frequency band different from the first frequency band) in the single transparent coil portion 320.

As described above, the transparent coil portion 320 according to various embodiments may be disposed in a single layer on one face of the transparent film member 310, and may be provided as a first coil portion 320 to be wound in one direction on the one face of the transparent film member 310. According to various embodiments, the first coil portion 320 is wound clockwise, and first terminals 331 and second terminals 332 may be connected to the ends of the first coil portion 320.

According to various embodiments, the terminal section 330 may include the first terminals 331 and the second terminals 332.

The first terminals 331 may be provided at the first coil portion 320, for example, the opposite ends of the first coil portion 320 such that current is input to/output from the first coil portion 320 for implementing a first frequency band. In addition, one of wound coils of the first coil portion 320 may be provided with LC element members 350 and 360 so as to restrict the input and output, via the first terminals 331, of the current of the second frequency band, which is input to/output from the first coil portion 320 via the second terminals 332.

The first terminals 331 may include a first input terminal 331a and a first output terminal 331b.

The first input terminal 331a may be provided at one end of the first coil portion 320 such that current for the first frequency band is input to the first coil portion 320 therethrough.

The first output terminal 331b may be provided at the remaining end of the first coil portion 320 such that the current for the first frequency band, which is input to the first coil portion 320 via the first input terminal 331a, can be output therethrough. Also, as described above, the first coil portion 320 is a constituent member to be shared such that not only the current for the first frequency band, but also the current for the second frequency band can be input and output. In order to restrict the input and output of the current, the above-described LC element members 350 and 360 may be disposed on the first output terminal 331b side.

For example, when the current for the second frequency band is input to and flows in the first coil portion 320, the flow of the current for the second frequency band is blocked by the LC element members 350 and 360, so that the flow of the current for the second frequency band toward the first output terminal 331b can be restricted and only the current for the first frequency band can flow toward the first output terminal 331b.

The second terminals 332 may be provided at the first coil portion 320, for example, the opposite ends of the first coil portion 320 adjacent to the first terminals 331 such that current is input to/output from the first coil portion 320 for implementing a second frequency band, which is different from the first frequency band.

The second terminals 332 may include a second input terminal 332a and a second output terminal 332b.

The second input terminal 332a may be provided at one end of the first coil portion 320 to be adjacent to the first input terminal 331a such that current for the second frequency band is input to the first coil portion 320 therethrough.

The second output terminal 332b may be connected to one of the wound coils of the first coil portion 320. Specifically, at least one of the wound coils of the first coil portion 320 is provided with LC element members 350 and 360, so that the current for the second frequency band is not input to the wound coil after the LC element members 350 and 360. Thus, the second output terminal 332b may be provided to extend from the end of the wound coil in which the LC element members 350 and 360 are mounted.

Thus, the first coil portion 320 is wound on the transparent film member 310, at one end of the first coil portion 320, the first input terminal 331a of the first terminal 331 and the second input terminal 332a of the second terminal 332 may be provided to be adjacent to each other and to be connected to the first coil portion 320, and at the remaining end of the first coil portion 320, the first output terminal 331b of the first terminals 331. The LC element members 350 and 360 may be mounted on at least one of the wound coils of the first coil portion 320, and the second output terminal 332b may be provided at a position adjacent to the wound coil on which the LC element members 350 and 360 are mounted.

Thus, current capable of implementing the first frequency band and the second frequency band may be input via the first input terminal 331a or the second input terminal 332a, and current for implementing the first frequency band or the second frequency band may flow in the first coil portion 320 wound on the transparent film member 310. For example, current for the first frequency band may be input to the first coil portion 320 via the first input terminal 331a, and the current may flow through the wound first coil portion 320, may pass through the wound coil on which the LC element members 350 and 360 are mounted, and may be then output through the first output terminal 331b.

Alternatively, current for the second frequency band may input to the first coil portion 320 via the second input terminal 332a, and the current may flow through the wound first coil portion 320, may be then prevented from flowing by the LC element members 350 and 360, and may be then output through the second output terminal 332b connected to the first coil portion 320 at a position close to the LC element members 350 and 360.

Hereinafter, in antenna device 400 according to various embodiments, a single transparent coil member 440 is formed in multiple layers on the opposite faces of the transparent film member 410, and the single transparent coil member 440 may be shared so as to implement different frequency bands.

Figure 10:
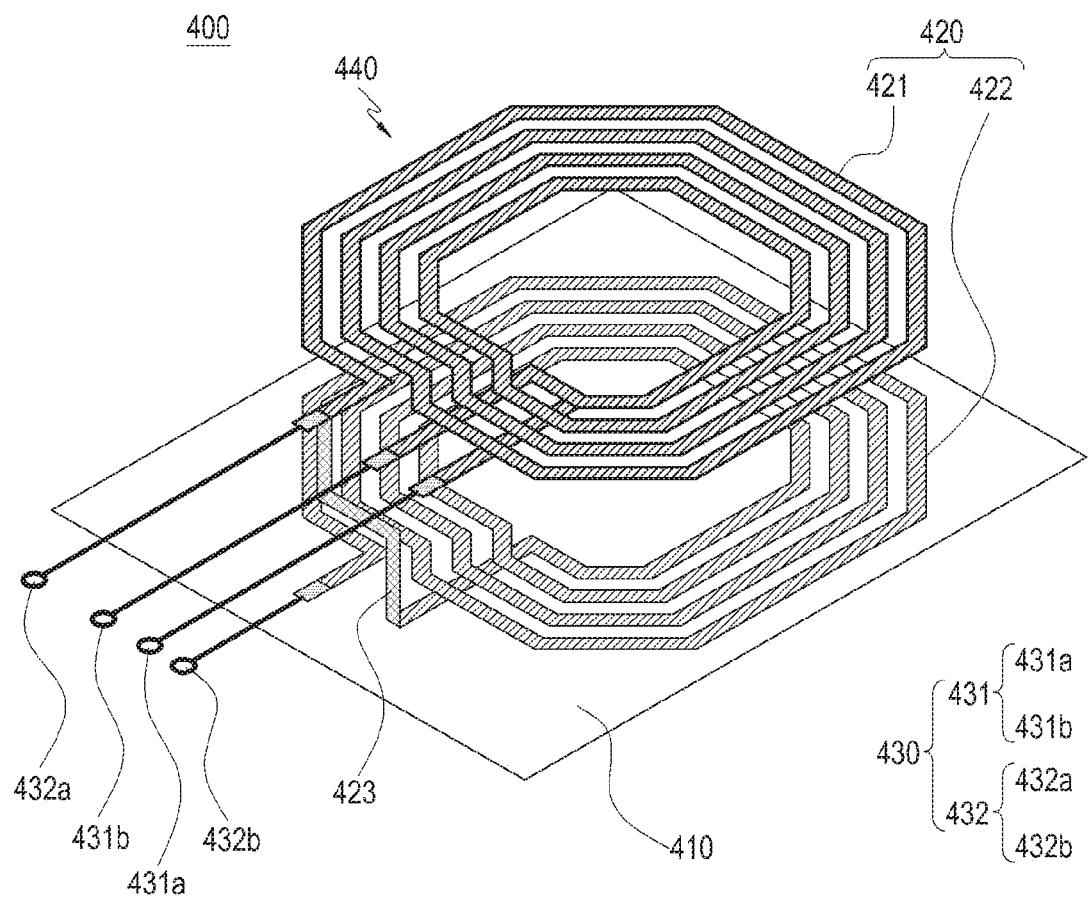
FIG. 10 is a view illustrating a structure of an antenna device according to one embodiment in an electronic device according to various embodiments.
Figure 11:
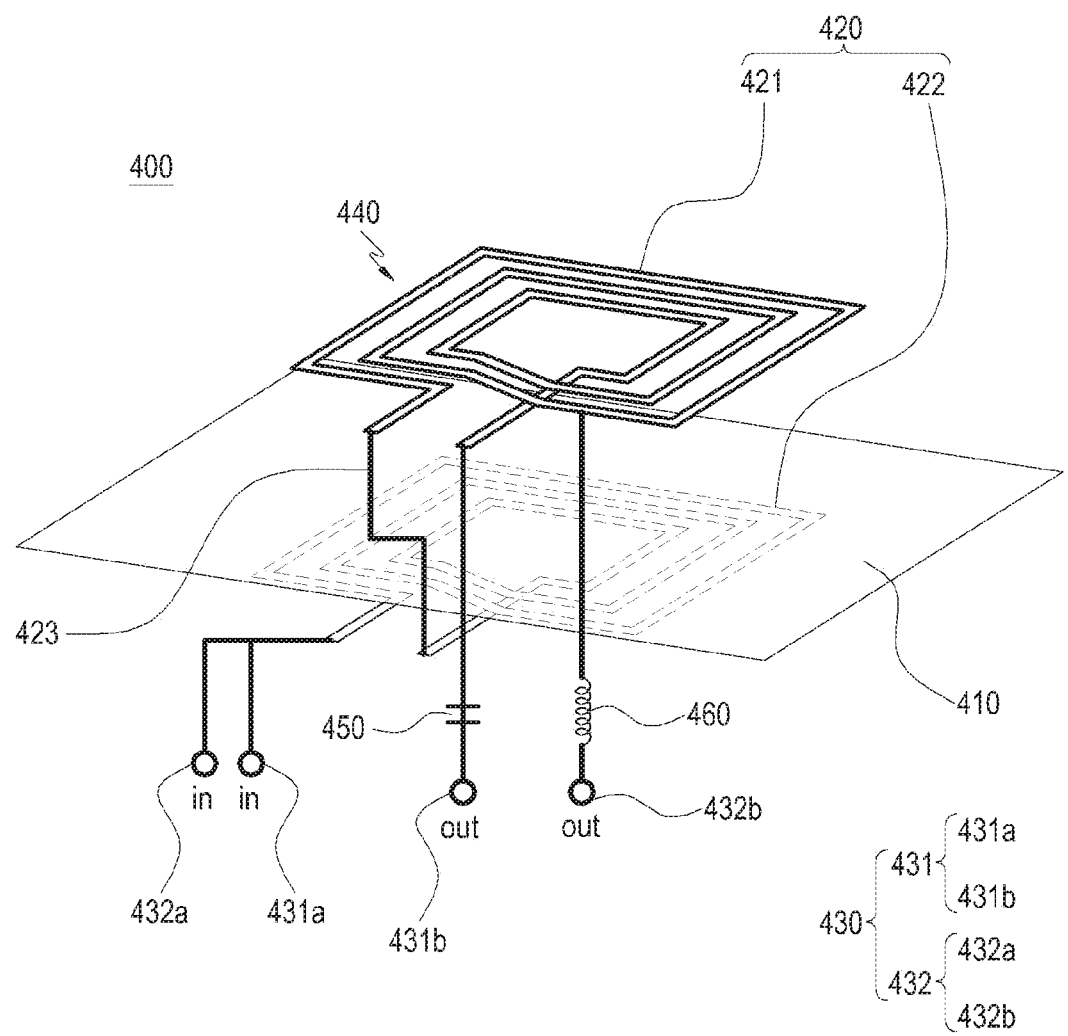
FIG. 11 is a view schematically illustrating an antenna device according to one embodiment in an electronic device according to various embodiments.

FIG. 10 is a view illustrating a structure of an antenna device 400 according to one embodiment in the electronic device 10 according to various embodiments. FIG. 11 is a view schematically illustrating an antenna device 400 according to one embodiment in the electronic device 10 according to various embodiments.

Referring to FIGS. 10 and 11, according to various embodiments, the antenna device 400 may include a transparent film member 410 and a transparent coil member 440.

The transparent film member 410 may be laminated on the top face or bottom face of a display, e.g., a touch panel. In addition, the transparent coil member 440 to be described later may be mounted on at least one of the opposite faces of the transparent film member 410 so as to implement two or more frequency bands.

The transparent coil member 440 may be provided in multiple layers on one face of the transparent film member 410 and may include transparent coil portions 420 and a terminal section 430.

The transparent coil portions 420 may be provided on the opposite faces of the transparent film member 410 to be connected each other and to be wound in one direction.

The terminal section 430, which includes a pair of terminals to input/output current to/from the transparent coil portion 420, may be connected to the transparent coil portion 420 so as to generate signals of a plurality of frequency bands (e.g., a first frequency band and a second frequency band different from the first frequency band) in one transparent coil portion 420.

As described above, according to various embodiments, the transparent coil portion 420 may be provided in multiple layers on the opposite faces of the transparent film member 410 to be connected.

According to various embodiments, the transparent coil portion 420 may include a first coil portion 421, a second coil portion 422, and a connection portion 423. The first coil portion 421 may be provided on one face of the transparent film member 410 to be wound in one direction. According to various embodiments of the present disclosure, the first coil portion 421 may be wound clockwise, at least one of the opposite ends of the first coil portion 421 may be provided with the terminal portion 430, and the remaining one of the opposite ends of the first coil portion 421 may be connected to the second coil portion 422 wound on the face, which is different from the face on which the first coil portion 421 is formed. The first terminal 431 and the second terminal 432, which will be described later, may be connected to each other.

The transparent coil portion 422 may be provided on the other face of the transparent film member 410 to be wound in one direction. According to various embodiments of the present disclosure, the second coil portion 422 may be wound clockwise, at least one of the opposite ends of the second coil portion 422 may be provided with the terminal portion 430, and the remaining one of the opposite ends of the second coil portion 422 may be connected to the first coil portion 421 wound on the face, which is different from the face on which the second coil portion 422 is formed.

The connection portion 423 may be provided in order to connect at least one end of the first coil portion 421 and at least one end of the second coil portion 422 to each other.

According to various embodiments, the terminal section 430 may include the first terminals 431 and the second terminals 432.

The first terminals 431 may be provided at an end of the first coil portion 421 and an end of the second coil portion 422. For example, the first terminals 431 may be provided at the opposite ends of the first coil portion 421, and may be provided such that current can be input to or output from the first coil portion 421 and the second coil portion 422 connected to the first coil portion 421 in order to implement a first frequency band.

Since the antenna device 400 according to various embodiments is configured to share one transparent coil portion 420 in order to implement different frequency bands, and LC element members 450 and 460, which restrict input and output of the current of the second frequency band, may be provided at the first terminal 431 so as to restrict the input and output of the current of the frequency bands, which share the transparent coil portion 420, at the same end.

The first terminals 431 may include a first input terminal 431a and a first output terminal 431b.

The first input terminal 431a may be provided at an end of the first coil portion 421, for example, at one end of the first coil portion 421, so that the current is input to the second coil portion 422 via the first coil portion 421 and the connection portion 423.

The first output terminal 431b may be provided at an end of the second coil portion 422 so that the current input from the first input terminal 431a flows to the second coil portion 422 via the first coil portion 421 and the connection portion 423 and is then output. Also, as described above, the first coil portion 421 and the second coil portion 422 are constituent members to be shared such that not only the current for the first frequency band but also the current for the second frequency band can be input and output. In order to restrict the mixed use of two frequency bands, the LC element members 450 and 460 may be disposed on one of the wound coils of the second coil portion 422 adjacent to the first output terminal 431b side.

The EL element members 450 and 460 are disposed on the second coil portion 422 adjacent to the first output terminal 431b so that the current of the first frequency band flows to the first output terminal 431b through the LC element members 450 and 460. Alternatively, the LC elements members 450 and 460 may be provided such that the current of the second frequency band to be described later cannot pass through the LC element members 450 and 460 and thus flows toward the second output terminal 432b. That is, when the current for the second frequency band is input to and flows in the first coil portion 421 and the second coil portion 422, the flow of the current for the second frequency band is blocked by the LC element members 450 and 460, so that the flow of the current for the second frequency band toward the first output terminal 431b can be restricted and only the current for the first frequency band can flow toward the first output terminal 431b.

The second terminals 432 may be provided adjacent to the first terminals 431 in the first coil portion 421 and the second coil portion 422 such that the current of the second frequency band different from the first frequency band can be input to or output from the second terminals 432.

The second terminals 432 may include a second input terminal 432a and a second output terminal 432b.

The second input terminal 432a may be provided at an end of the first coil portion 421 to be adjacent to the first input terminal 431a such that current for the second frequency band, which is different from the first frequency band, is input to the first coil portion 421 therethrough.

The second output terminal 432b may be connected to one of the wound coils of the first coil portion 421. Specifically, at least one of the wound coils of the first coil portion 421 is provided with LC element members 450 and 460, so that the current for the second frequency band is not input to the wound coil after the LC element members 450 and 460. Thus, the second output terminal 432b may be provided to extend from the end of the wound coil in which the LC element members 450 and 460 are mounted.

Thus, the first input terminal 431a and the second input terminal 432a are connected to one end of the first coil portion 421, and the first coil portion 421 is wound in one direction on one face of the transparent film member 410. The remaining end of the first coil portion 421 is moved to the other face of the transparent film member 410 through the connection portion 423 and is connected to one end of the second coil portion 422, and the second coil portion 422 may be provided to be wound on one direction on the other face of the transparent film member 410. In addition, the first output terminal 431b may be connected to the remaining end of the second coil portion 422, an LC element member 450 or 460 may be mounted on at least one of the wound coils of the second coil portion 422, and the second output terminal 432b may be provided to be connected to the wound coil of the second coil portion 422 at the LC element member 450 or 460 side.

Thus, current capable of implementing the first frequency band and the second frequency band may be input via the first input terminal 431a or the second input terminal 432a, and current for implementing the first frequency band or the second frequency band may flow in the first coil portion 421 and the second coil portion 422, which are respectively wound on the opposite faces of the transparent film member 410. For example, current for the first frequency band may be input to the first coil portion 421 and the second coil portion 422 via the first input terminal 431a, and the current may flow through the wound first coil portion 421 and second coil portion 422, may pass through the wound coil on which the LC element members 450 and 460 are mounted, and may be then output through the first output terminal 431b.

Alternatively, current for the second frequency band may input to the first coil portion 421 and the second coil portion 422 via the second input terminal 432a, and the current may flow through the first coil portion 421 and the second coil portion 422, which are wound on the other face of the transparent film member 410, may be then prevented from flowing by the LC element members 450 and 460, and may be then output through the second output terminal 432b connected to the wound coil of the second coil portion 422 at a position close to the LC element members 450 and 460.

Figure 12:
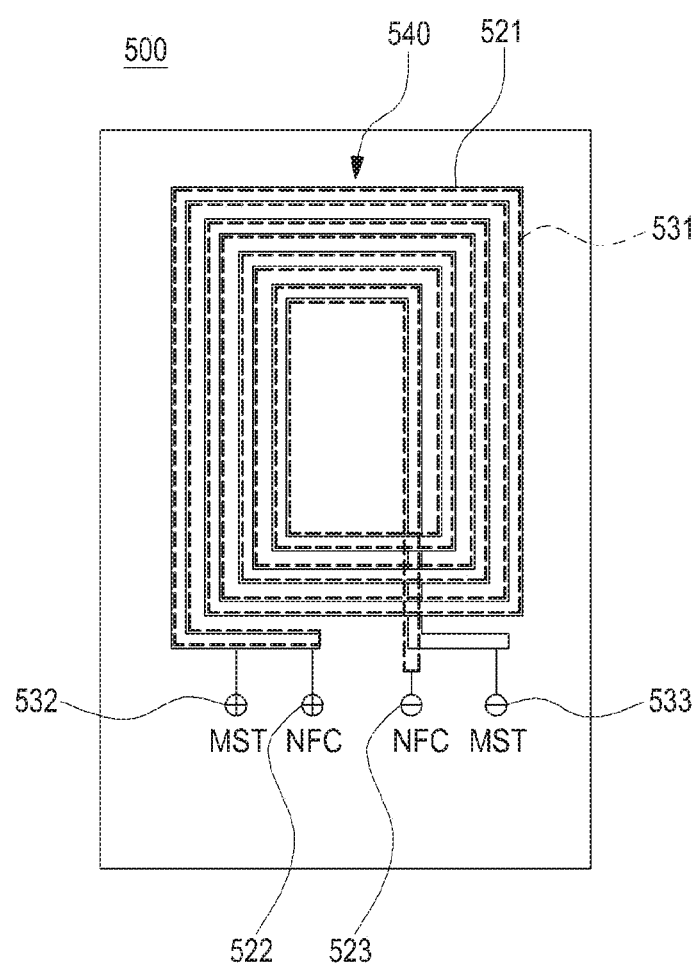
FIG. 12 is a view illustrating an antenna device according to one embodiment in an electronic device according to various embodiments.
Figure 13:
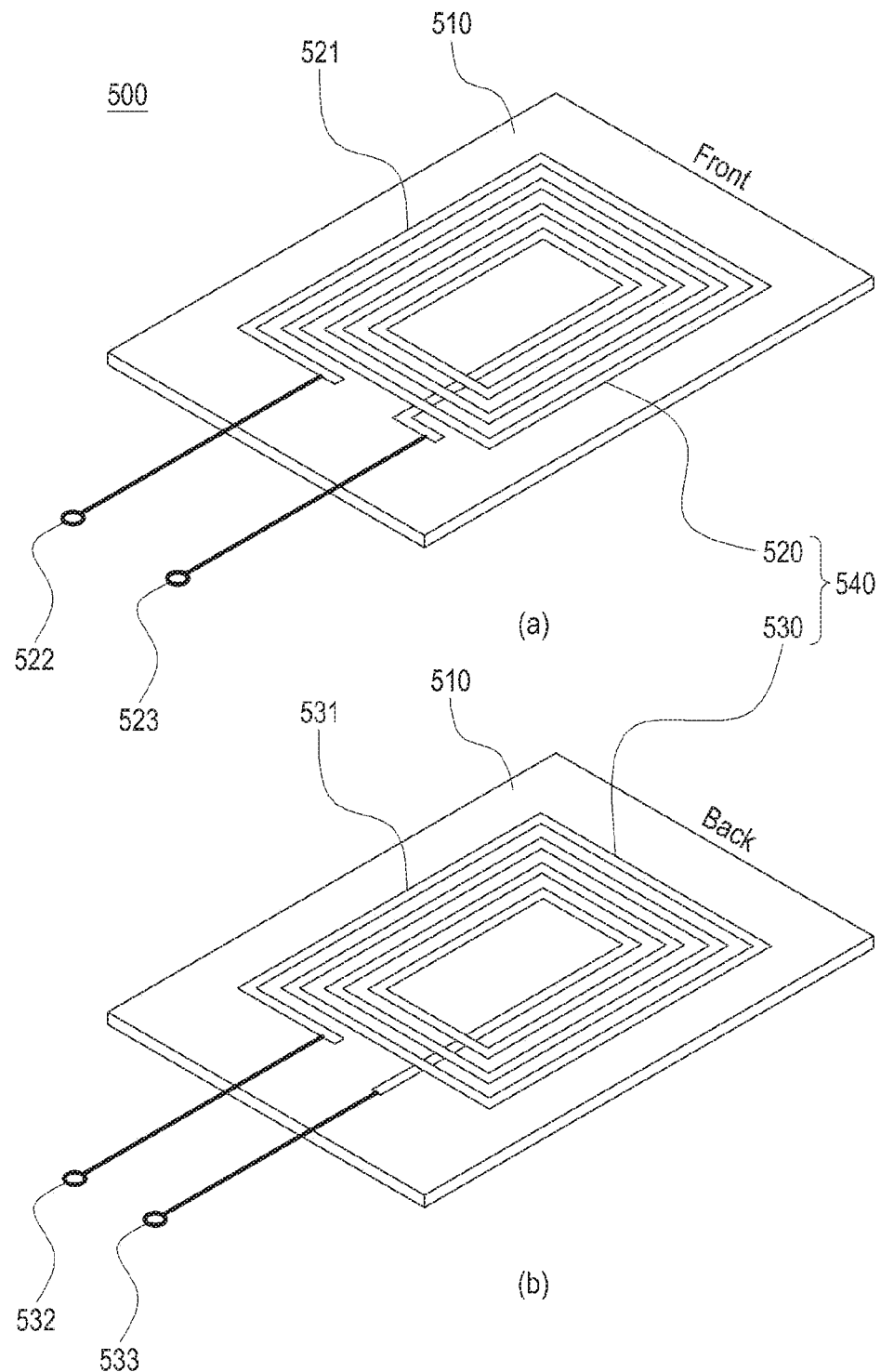
FIG. 13 illustrates a state in which transparent coil members are provided on top and bottom faces of a transparent coil member according to one embodiment in an electronic device according to various embodiments.

FIG. 12 is a view illustrating an antenna device 500 according to one embodiment in an electronic device according to various embodiments. FIG. 13 illustrates a state in which transparent coil members 540 are provided on top and bottom faces of a transparent film member 510 according to one embodiment in an electronic device according to various embodiments.

Referring to FIGS. 12 and 13, according to various embodiments, the antenna device 500 may include the transparent film member 510 and the transparent coil members 540.

The transparent film member 510 may be stacked on the top face or the bottom face of a display, e.g., a touch panel. In addition, the transparent coil member 540 to be described later may be mounted on at least one of the opposite faces of the transparent film member 510 so as to implement two or more frequency bands.

The transparent coil member 540 may include a first transparent coil member 520 and a second transparent coil member 530.

In various embodiments, the first transparent coil member 520 may be made for, for example, Near Field Communication (NFC) having a first frequency band, and the second transparent coil member 530 may made for, for example, Magnetic Secure Transmission (MST) having a second frequency band, which is different from that of the NFC.

As described above, according to various embodiments, the first transparent coil member 520 may be provided to be wound on one face of the transparent film member 510, and may be provided to implement the first frequency band.

According to various embodiments, the first transparent coil portion 520 may include a first coil portion 521, a first input terminal 522, and a first output terminal 523.

The first coil portion 521 may be provided to be wound in at least one direction on one face of the transparent film member 510 and at least one of the opposite ends of the first coil portion 521 may be connected to the first input terminal 522 to be described later, and the remaining one of the opposite ends of the first coil portion 521 may be connected to the first output terminal 523 to be described later. The first coil portion 521 may be provided to implement the first frequency band according to the current to be input to the first input terminal 522.

The first input terminal 522 and the first output terminal 523 may be respectively provided at the opposite ends of the first coil portion 521 and may be disposed adjacent to each other.

According to various embodiments, the first input terminal 522 may be connected to one end of the first coil portion 521 such that current is input to the first coil portion 521 therethrough.

The first output terminal 523 may be connected to the remaining one of the first coil portion 521 such that the current, which is input to the first coil portion 521 and the second coil portion 531 through the second input terminal 522, is output therethrough.

As described above, according to various embodiments, the second transparent coil member 530 may be provided to be wound on the opposite faces of the transparent film member 510, and may be provided to implement the second frequency band.

According to various embodiments, the second transparent coil portion 530 may include a second coil portion 531, a second input terminal 532, and a second output terminal 533.

The second coil portion 531 may be provided to be wound in at least one direction on one face of the transparent film member 510 and at least one of the opposite ends of the second coil portion 531 may be connected to the second input terminal 532 to be described later, and the remaining one of the opposite ends of the second coil portion 531 may be connected to the second output terminal 533 to be described later. The second coil portion 531 may be provided to implement the first frequency band according to the current to be input to the second input terminal 532.

The second input terminal 532 and the second output terminal 533 may be respectively provided at the opposite ends of the second coil portion 531 and may be disposed adjacent to each other.

According to various embodiments, the first input terminal 522 may be connected to one end of the first coil portion 521 such that current is input to the second coil portion 531 therethrough.

The first output terminal 523 may be connected to the remaining one of the first coil portion 521 such that the current, which is input to the first coil portion 521 and the second coil portion 531 through the second input terminal 522, is output therethrough.

Figure 14:
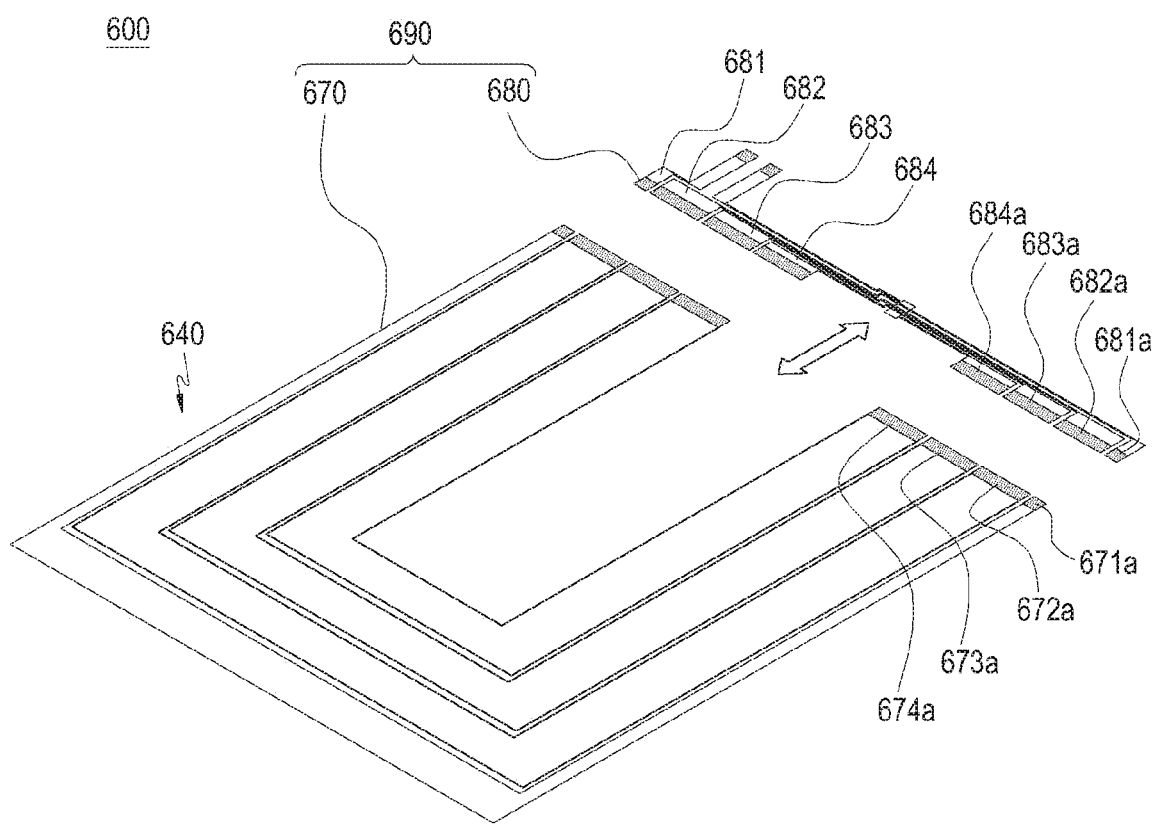
FIG. 14 is a view schematically illustrating how to form the transparent coil member in the electronic device according to various embodiments.
Figure 15:
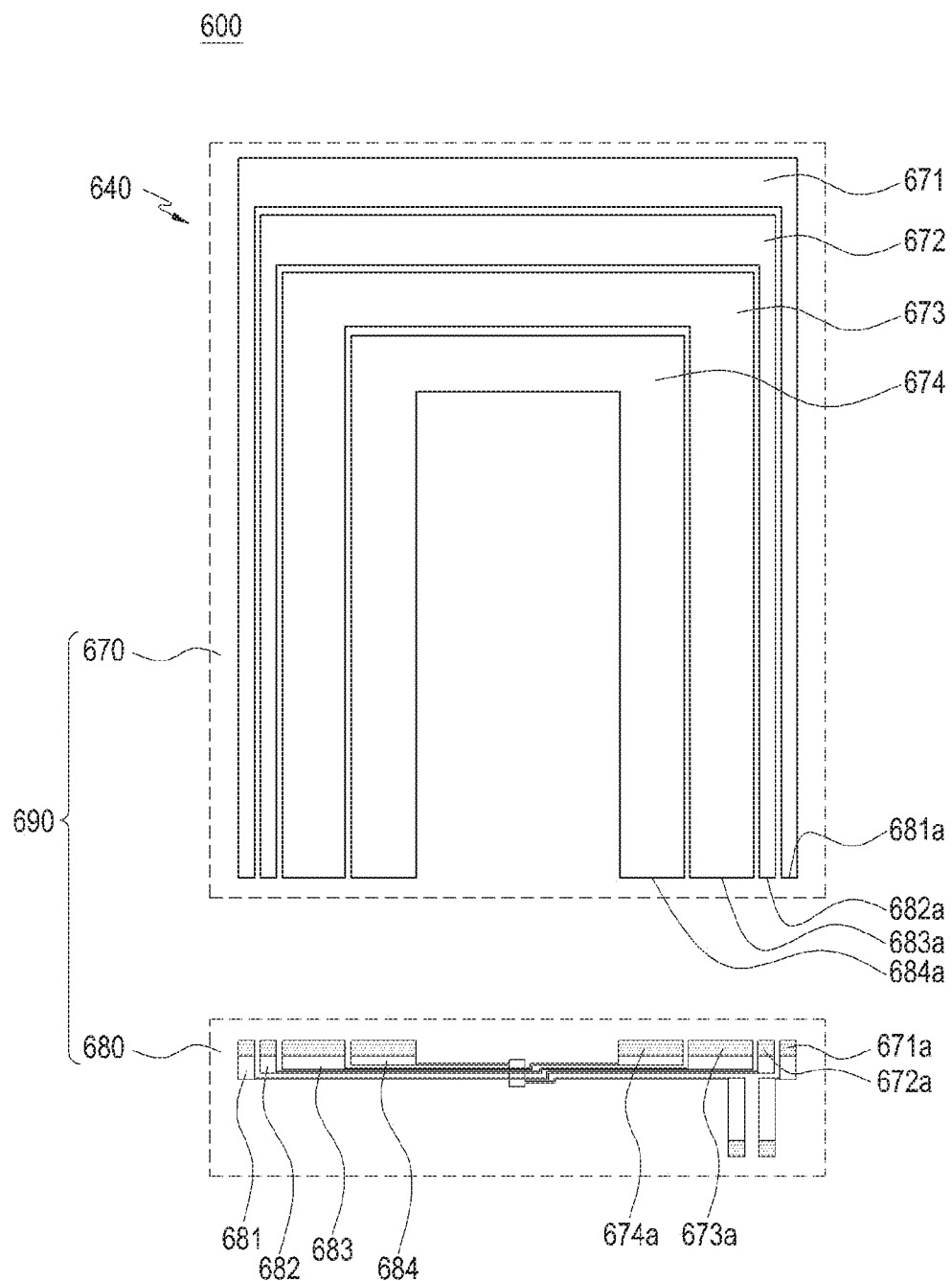
FIG. 15 is a plan view illustrating how to form a transparent coil member in the electronic device according to various embodiments.
Figure 16:
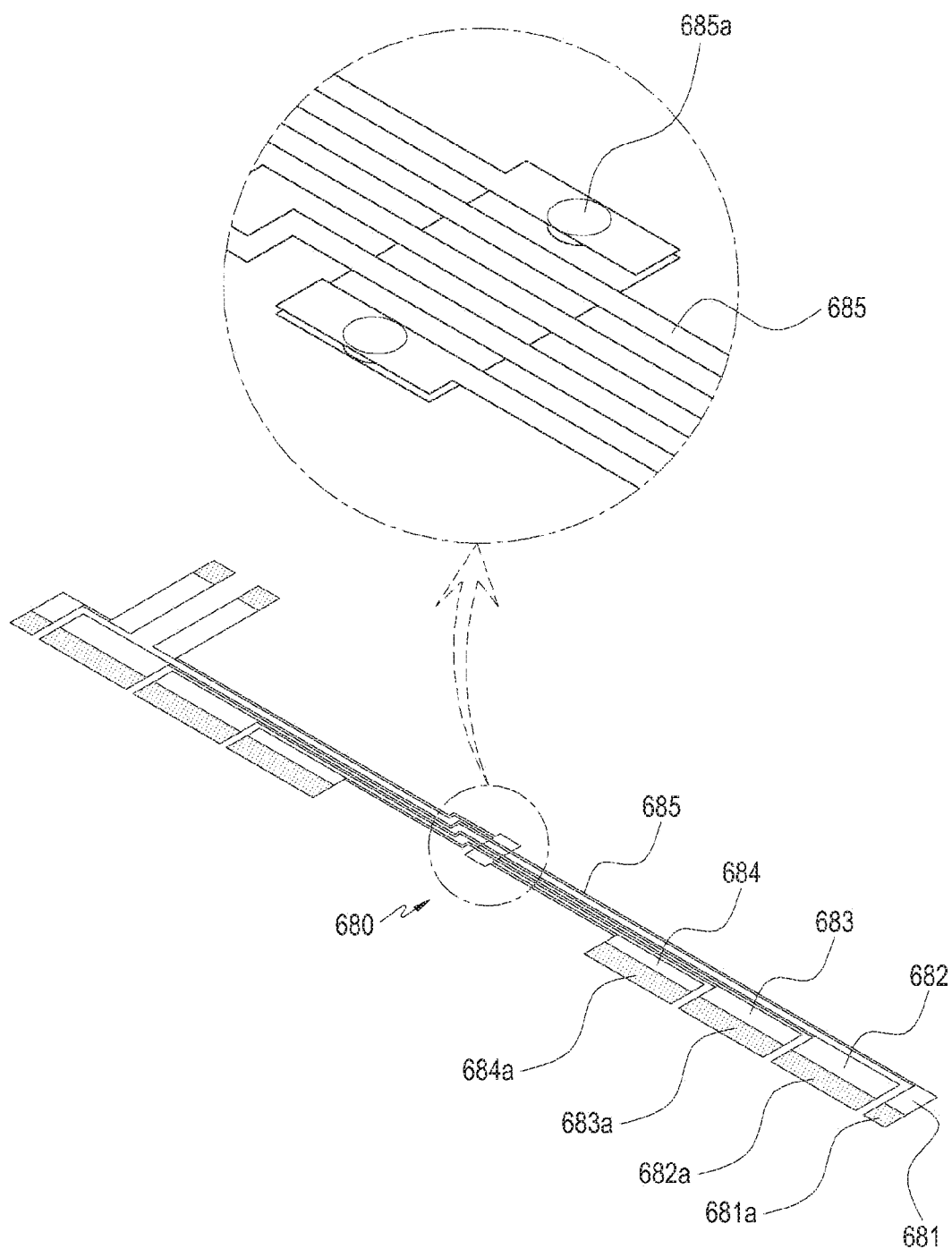
FIG. 16 is a view illustrating a part of the transparent coil member in the electronic device according to various embodiments in an enlarged scale.
Figure 17:
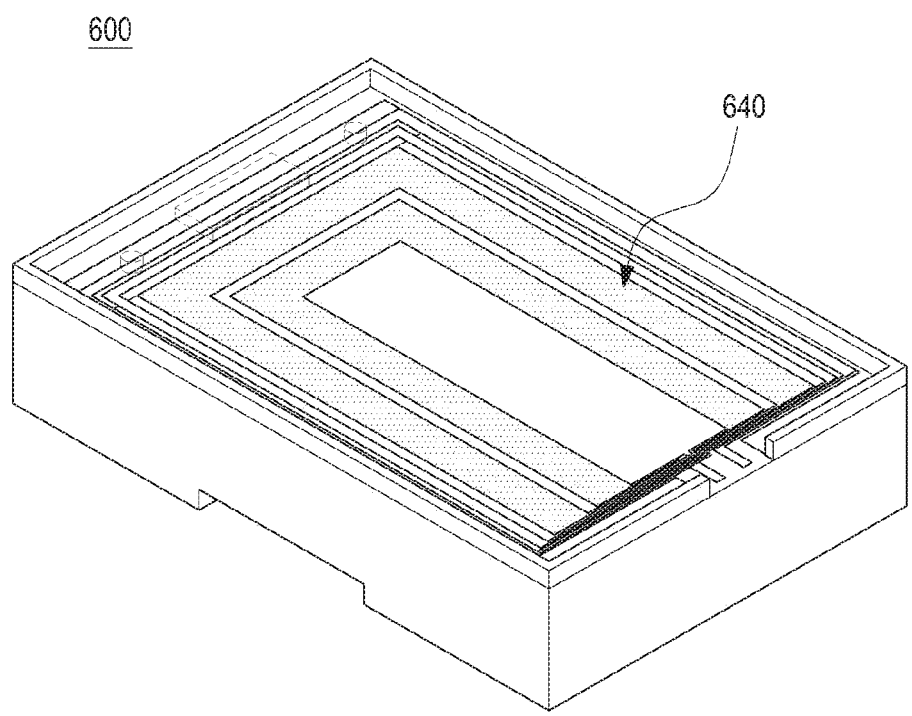
FIG. 17 is a view illustrating a state in which an antenna device is stacked on one face of the electronic device according to various embodiments.

FIG. 14 is a view schematically illustrating how to form the transparent coil member in the electronic device 10 according to various embodiments. FIG. 15 is a plan view illustrating how to form a transparent coil member in the electronic device 10 according to various embodiments. FIG. 16 is a view illustrating a part of the transparent member in the electronic device 10 according to various embodiments in an enlarged scale. FIG. 17 is a view illustrating a state in which an antenna device 600 is stacked on one face of the electronic device 10 according to various embodiments.

Referring to FIGS. 14 to 17, an antenna device 600, which may be implemented according to various embodiments as described above, may be located not only in the non-display region of the display 20, but also in the display region of the display 20. In order to generate an H-field of the antenna device 600, the transparent coil member wound on the transparent film member should be implemented in the form of a closed circuit.

In order to implement the transparent coil member 670 according to various embodiments in the form of the closed circuit, two members may be coupled at the time of assembling the transparent coil member.

For example, two members, i.e. a first transparent film 670 and a connection circuit board 680 connected to the first transparent film 670 may be provided. One end of the first transparent film 670 may be connected to the connection circuit board 680, and on at least one face of the first transparent film 670, a plurality of ∩-shaped printed coils 671 to 674 may be provided to be adjacent to each other in order to implement a first frequency band and a second frequency band. In addition, one end of the connection circuit board 680 may be connected to the first transparent film 670, and connection coils 681 to 684, which are respectively connected to the ends 671a to 674a of the plurality of ∩-shaped printed coils 671 to 674, and connection lines 685, which connect the connection coils 681 to 684 in the form of a wound shape, may be formed on the one face of the connection circuit board 680. That is, when the first transparent film 670 and the connecting circuit board 680 are coupled to each other, the ends 671a to 674a of the printing coils 671 to 674 may be connected to the respective ends 681a to 684a of the connection coils 681 to 684.

In addition, via holes 685a may be formed in the connection lines 685 such that the connection lines can be connected to the connection coils 681 to 684, which are to be connected thereto in the wound shape, through the via holes 685a.

Accordingly, according to various embodiments, the antenna device 600 can be disposed in the display region of the display 20, and can implement two or more frequency bands.

Hereinafter, an electronic device according to various embodiments will be described with reference to the accompanying drawings. Herein, the term "user" may refer to a person who uses an electronic device or a device that uses an electronic device (e.g., an artificial intelligence electronic device).

Figure 18:
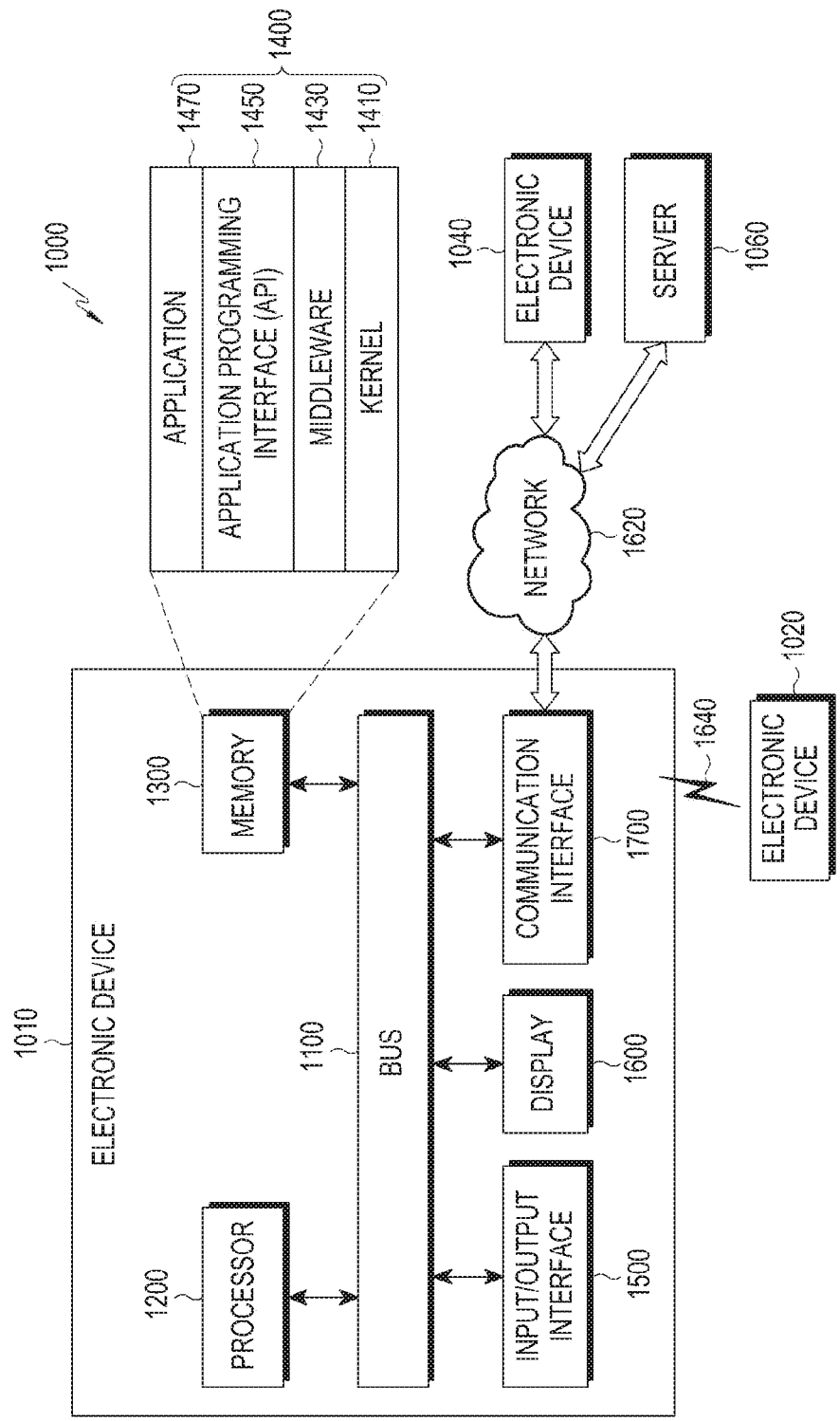
FIG. 18 is a view illustrating an electronic device within a network environment in various embodiments.

Descriptions will be made on an electronic device 1010 within a network environment 1000 in various embodiments with reference to FIG. 18. The electronic device 1010 may include a bus 1100, a processor 1200, a memory 1300, an input/output interface 1500, a display 1600, and a communication interface 1700. In a certain embodiment, at least one of the above-mentioned components may be omitted from the electronic device 1010, or the electronic device may be additionally provided with other components.

The bus 1100 may include, for example, a circuit that connects the above-mentioned components 1200, 1300, 1500, 1600, and 1700 and transmits communication (e.g., a control message and/or data) between the components.

The processor 1200 may include one or more of a Central Processing Unit (CPU), an Application Processor (AP), and a Communication Processor (CP). The processor 1200 may execute, for example, an arithmetic operation or data processing that is related to a control and/or communication of one or more other components of the electronic device 1010. The processor 1200 may be referred to as a controller or may include the controller as a part thereof. Alternatively, the processor 1200 may form the controller.

The memory 1300 may include a volatile memory and/or a non-volatile memory. The memory 1300 may store, for example, commands or data that are related to one or more other components of the electronic device 1010. According to one embodiment, the memory 1300 may store software and/or a program 1400. The program 1400 may include, for example, a kernel 1410, a middleware 1430, an Application Programming Interface (API) 1450, and/or an application program (or an "application") 1470. At least one of the kernel 1410, the middleware 1430, and the API 1450 may be referred to as an Operating System (OS).

The kernel 1410 may control or manage, for example, system resources (e.g., the bus 1100, the processor 1200, and the memory 1300) that are used for executing operations or functions implemented in the other programs (e.g., the middleware 1430, the API 1450, or the application 1470). In addition, the kernel 1410 may provide an interface that allows the middleware 1430, the API 1450, or the application programs 1470 to access individual components of the electronic device 1010 so as to control or manage the system resources.

The middleware 1430 may play an intermediary role such that, for example, the API 1450 or the application 1470 may communicate with the kernel 1410 so as to exchange data.

In addition, the middleware 1430 may process one or more task requests which are received from the applications 1470, according to priority. For example, the middleware 1430 may assign the priority to be capable of using a system resource of the electronic device 1010 (e.g., the bus 1100, the processor 1200, or the memory 1300) to at least one of the application programs 1470. For example, the middleware 1430 may perform scheduling, load balancing, or the like for the one or more task requests by processing the one or more requests according to the assigned priority.

The API 1450 is, for example, an interface that allows the applications 1470 to control functions provided from the kernel 1410 or the middleware 1430, and may include, for example, one or more interfaces or functions (e.g., commands) for a file control, a window control, an image processing, or a character control.

The input/output interface 1500 may serve as an interface to transmit commands or data, which are entered from, for example, a user or any other external device, to the other component(s) of the electronic device 1010. Also, the input/output interface 1500 may output commands or data, which are received from the other component(s) of the electronic device 1010, to the user or the other external device.

The display 1600 may include, for example, a Liquid Crystal Display (LCD), a Light Emitting Diode (LED) display, an Organic Light Emitting Diode (OLED) display, or a MicroElectroMechanical System (MEMS) display, or an electronic paper display. The display 1600 may display various contents (e.g., text, image, video, icon, or symbol) to, for example, the user. The display 1600 may include a touch screen, and may receive a touch input, a gesture input, a proximity input, or a hovering input that is made using, for example, an electronic pen or a part of the user's body.

The communication interface 1700 may set, for example, communication between the electronic device 1010 and an external device (e.g., a first external electronic device 1020, a second external device 1040, or a server 1060). For example, the communication interface 1700 may be connected with a network 1620 through wired or wireless communication so as to communicate with the external device (e.g., the second external electronic device 1040 or the server 1060). The communication interface 1700 may include a Communication Interface (CP), and the communication processor may form one of a plurality of modules that form the communication interface 1700. In one embodiment, the communication processor may be included in the processor 1200.

The wireless communication may use at least one of, for example, Long-Term Evolution (LTE), LTE Advance (LTE-A), Code Division Multiple Access (CDMA), Wideband CDMA (WCDMA), Universal Mobile Telecommunication System (UMTS), Wireless Broadband (WiBro), or Global System for Mobile communication (GSM), as a cellular communication protocol. In addition, the wireless communication may include, for example, short-range communication 1640. The short-range communication 1640 may include at least one of, for example, Wireless Fidelity (Wi-Fi), Bluetooth, Near Field Communication (NFC), and Global Navigation Satellite System (GNSS). GNSS may include, for example, at least one of Global Positioning System (GPS), Global Navigation Satellite System (Glonass), Beidou Navigation Satellite System (hereinafter, "Beidou"), Galileo, and the European global satellite-based navigation system, according to, for example, a use area or bandwidth. Herein, "GPS" may be interchangeably used with "GNSS" below. The wired communication may use at least one of, for example, Universal Serial Bus (USB), High Definition Multimedia Interface (HDMI), Recommended Standard 23200 (RS-23200), and Plain Old Telephone Service (POTS). The network 1620 may include a telecommunication network, for example, at least one of a computer network (e.g., LAN or WAN), the internet, and a telephone network.

Each of the first and second external electronic devices 1020 and 1040 may be the same type as or different from the electronic device 1010. According to one embodiment, the server 1060 may include a group of one or more servers. According to various embodiments, all or some of the operations to be executed by the electronic device 1010 may be executed by another electronic device or a plurality of other electronic devices (e.g., the electronic devices 1020 and 1040 or the server 1060). According to one embodiment, in the case where the electronic device 1010 should perform a certain function or service automatically or by a request, the electronic device 1010 may request some functions or services that are associated therewith from the other electronic devices (e.g., the electronic devices 1020 and 1040 or the server 1060), instead of or in addition to executing the functions or service by itself. The other electronic devices (e.g., the electronic devices 1020 and 1040 or the server 1060) may execute the requested functions or additional functions, and may deliver the results to the electronic device 1010. The electronic device 1010 may provide the requested functions or services by processing the received results as they are or additionally. For this purpose, for example, a cloud computing technique, a distributed computing technique, or a client-server computing technique may be used.

Figure 19:
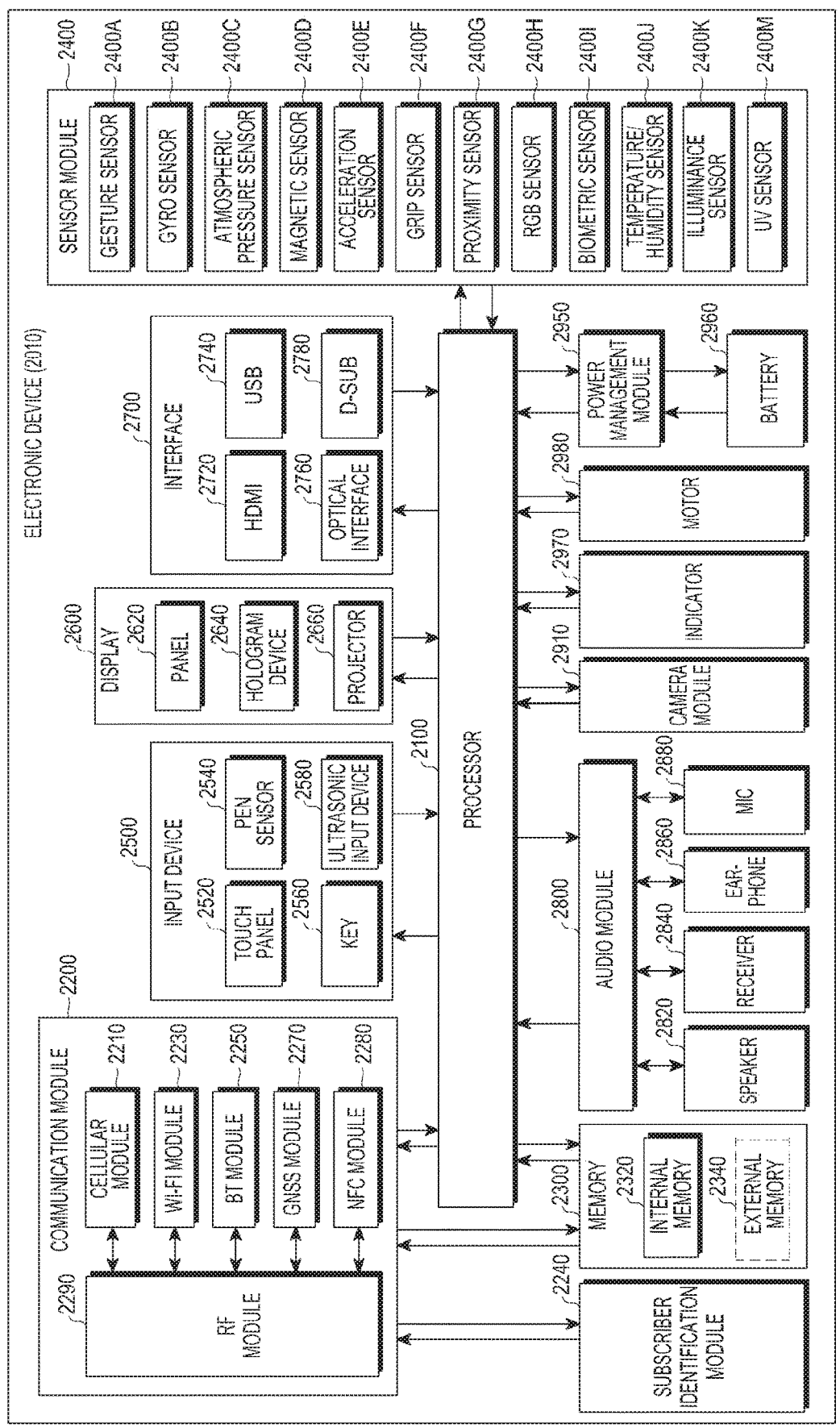
FIG. 19 is a block diagram of an electronic device according to various embodiments.

FIG. 19 is a block diagram of an electronic device 2010 according to various embodiments. The electronic device 2010 may include, for example, the whole or a portion of the electronic device 1010 illustrated in FIG. 18. The electronic device 2010 may include at least one processor (e.g., an Application Processor (AP)) 2100, a communication module 2200, a memory 2300, a sensor module 2400, an input device 2500, and a display 2600, and the electronic device 2010 may further include a subscriber identification module 2240, an interface 2700, an audio module 2800, a camera module 2910, a power management module 2950, a battery 2960, an indicator 2970, and a motor 2980.

The processor 210 may drive, for example, an operating system or an application program so as to control a plurality of hardware or software components connected thereto, and may also perform various data processing and arithmetic operations. The processor 2100 may be implemented by, for example, a System-on-Chip (SoC). According to one embodiment, the processor 210 may further include a Graphic Processing Unit (GPU) and/or an image signal processor. The processor 210 may include at least some components (e.g., a cellular module 2210) among the components illustrated in FIG. 19. The processor 210 may load a command or data received from at least one of the other components (e.g., a non-volatile memory) in a volatile memory to process the command and data, and may store various data in a non-volatile memory.

The communication module 220 may have a configuration that is the same as or similar to the communication interface 1700 of FIG. 19. The communication module 2200 may include, for example, a cellular module 2210, a Wi-Fi module 2230, a Bluetooth module 2250, a GNSS module 2270 (e.g., GPS module, Glonass module, Beidou module, or Galileo module), an NFC module 2280, and a Radio Frequency (RF) module 2290.

The cellular module 2210 may provide, for example, a voice call, a video call, a message service, or an internet service through a communication network. According to one embodiment, the cellular module 2210 may perform discrimination and authentication of the electronic device 2010 within the communication network by using the subscriber identification module (e.g., a SIM card) 2240. According to one embodiment, the cellular module 2210 may perform at least some of the multimedia control functions that may be provided by the processor 210. According to one embodiment, the cellular module 2210 may include a Communication Processor (CP).

Each of the Wi-Fi module 2230, the Bluetooth module 2250, the GNSS module 2270, and the NFC module 2280 may include, for example, a processor to process data transmitted/received through a corresponding module. According to a certain embodiment, at least some (e.g., two or more) of the cellular module 2210, the Wi-Fi module 2230, the Bluetooth module 2250, the GNSS module 2270, and the NFC module 2280 may be incorporated in a single Integrated Chip (IC) or an IC package.

The RF module 2290 may transmit/receive a communication signal (e.g., an RF signal). The RF module 2290 may include, for example, a transceiver, a Power Amp Module (PAM), a frequency filter, a Low Noise Amplifier (LNA), or an antenna. According to another embodiment, at least one of the cellular module 2210, the Wi-Fi module 2230, the Bluetooth module 2250, the GNSS module 2270, and the NFC module 2280 may transmit/receive an RF signal through one or more separate RF modules.

The subscriber identification module 2240 may include, for example, a card that includes a subscriber identification module and/or an embedded SIM, and may also include intrinsic identification information (e.g., Integrated Circuit Card IDentifier (ICCID)) or subscriber information (e.g., International Mobile Subscriber Identity (IMSI)).

The memory 2300 (e.g., memory 1300) may include, for example, an internal memory 2320 or an external memory 2340. The internal memory 2320 may include at least one of, for example, a volatile memory (e.g., Dynamic RAM (DRAM), Static RAM (SRAM), or Synchronous DRAM (SDRAM)), a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory (e.g., NAND flash memory, or NOR flash memory), hard drive, or Solid-State Drive (SSD)).

The external memory 2340 may further include a flash drive (e.g., Compact Flash (CF), Secure Digital (SD), Micro Secure Digital (Micro-SD), Mini Secure Digital (Mini-SD), extreme Digital (xD), Multi-Media Card (MMC), or memory stick). The external memory 2340 may be functionally and/or physically connected to the electronic device 2010 through various interfaces.

For example, the sensor module 2400 may measure a physical quantity or may sense an operating status of the electronic device 2010, and may then convert the measured or sensed information into electric signals. The sensor module 2400 may include at least one of, for example, a gesture sensor 2400A, a gyro sensor 2400B, an atmospheric pressure sensor 2400C, a magnetic sensor 2400D, an acceleration sensor 2400E, a grip sensor 2400F, a proximity sensor 2400G, a color sensor 2400H (e.g., RGB (Red, Green, Blue) sensor), a biometric sensor 2400I, a temperature/humidity sensor 2400J, an illuminance sensor 2400K, and an Ultra-Violet (UV) sensor 2400M. Additionally or alternatively, the sensor module 2400 may include, for example, an E-nose sensor, an ElectroMyoGraphy (EMG) sensor (not illustrated), an ElectroEncephaloGram (EEG) sensor, an ElectroCardioGram (ECG) sensor, an Infra-Red (IR) sensor, an iris sensor, and/or a fingerprint sensor. The sensor module 2400 may further include a control circuit for controlling one or more sensors incorporated therein. In a certain embodiment, the electronic device 2010 may further include a processor configured to control the sensor module 2400 as a part of the processor 210 or separate from the processor 210 so as to control the sensor module 2400 while the processor 210 is in the sleep state.

The input device 2500 may include a touch panel 2520, and the input device 2500 may further include at least one of a (digital) pen sensor 2540, a key 2560, and an ultrasonic input device 2580. As the touch panel 2520, at least one of, for example, a capacitive type touch panel, a resistive type touch panel, an infrared type touch panel, and an ultrasonic type panel may be used. Also, the touch panel 2520 may further include a control circuit. The touch panel 2520 may further include a tactile layer so as to provide a tactile reaction to the user.

The (digital) pen sensor 2540 may be, for example, a portion of the touch panel or may include a separate recognition sheet. The key 2560 may include, for example, a physical button, an optical key, or a keypad. The ultrasonic input device 2580 may sense, through a microphone (e.g., a microphone 2880), ultrasonic waves generated by an input tool so as to confirm data corresponding to the sensed ultrasonic waves.

The display 2600 (e.g., the display 1600) may include a panel 2620, and the display 2600 may further include a hologram device 2640 and/or a projector 2660. The panel 2620 may include a configuration that is the same as or similar to that of the display 1600 of FIG. 18. The panel 2620 may be implemented to be, for example, flexible, transparent, or wearable. The panel 2620 may be configured as a single module with the touch panel 2520. The hologram device 2640 may show a stereoscopic image in the air using interference of light. The projector 2660 may project light onto a screen so as to display an image. The screen may be located, for example, inside or outside the electronic device 2010. According to one embodiment, the display 2600 may further include a control circuit to control the panel 2620, the hologram device 2640, or the projector 2660.

The interface 2700 may include at least one of, for example, a High-Definition Multimedia Interface (HDMI) 2720, a Universal Serial Bus (USB) 2740, an optical interface 2760, and a D-subminiature (D-sub) 2780. For example, the interface 2700 may be included in the communication interface 1700 illustrated in FIG. 18. Additionally or alternatively, the interface 2700 may include, for example, a Mobile High-definition Link (MHL) interface, a Secure Digital (SD) card/Multi-Media Card (MMC) interface, or an Infrared Data Association (IrDA) standard interface.

The audio module 2800 may bi-directionally convert, for example, sound and electric signals. At least some of the components of the audio module 2800 may be included in, for example, the input/output interface 1500 illustrated in FIG. 18. The audio module 2800 may process sound information input or output through, for example, a speaker 2820, a receiver 2840, an earphone 2860, or a microphone 2880.

The camera module 2910 is a device that is capable of photographing, for example, a still image and a video image, and according to one embodiment, the camera module 2910 may include at least one image sensor (e.g., a front sensor or a back sensor), a lens, an Image Signal Processor (ISP), or a flash (e.g., LED or xenon lamp).

The power management module 2950 may manage, for example, the electric power of the electronic device 2010. According to one embodiment, the power management module 2950 may include a Power Management Integrated Circuit (PMIC), a charger Integrated Circuit (IC), or a battery or fuel gauge. The PMIC may be configured as a wired and/or wireless charge type. The wireless charging type may include, for example, a magnetic resonance type, a magnetic induction type, or an electromagnetic wave type, and may further include an additional circuit for wireless charging (e.g., a coil loop, a resonance circuit, or a rectifier). The battery gauge may measure the residual capacity of the battery 2960, and a voltage, a current, or a temperature during the charge. The battery 2960 may include, for example, a rechargeable battery and/or a solar battery.

The indicator 2970 may indicate a specific status (e.g., a booting status, a message status, or a charged status) of the electronic device 2010 or of a part thereof (e.g., the processor 210). The motor 2980 may convert an electric signal into a mechanical vibration, and may generate, for example, a vibration or a haptic effect. Although not illustrated, the electronic device 2010 may include a processor (e.g., a GPU) to support a mobile TV. The processor to support a mobile TV may process media data according to the standards of, for example, Digital Multimedia Broadcasting (DMB), Digital Video Broadcasting (DVB), or MediaFlo™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 20:
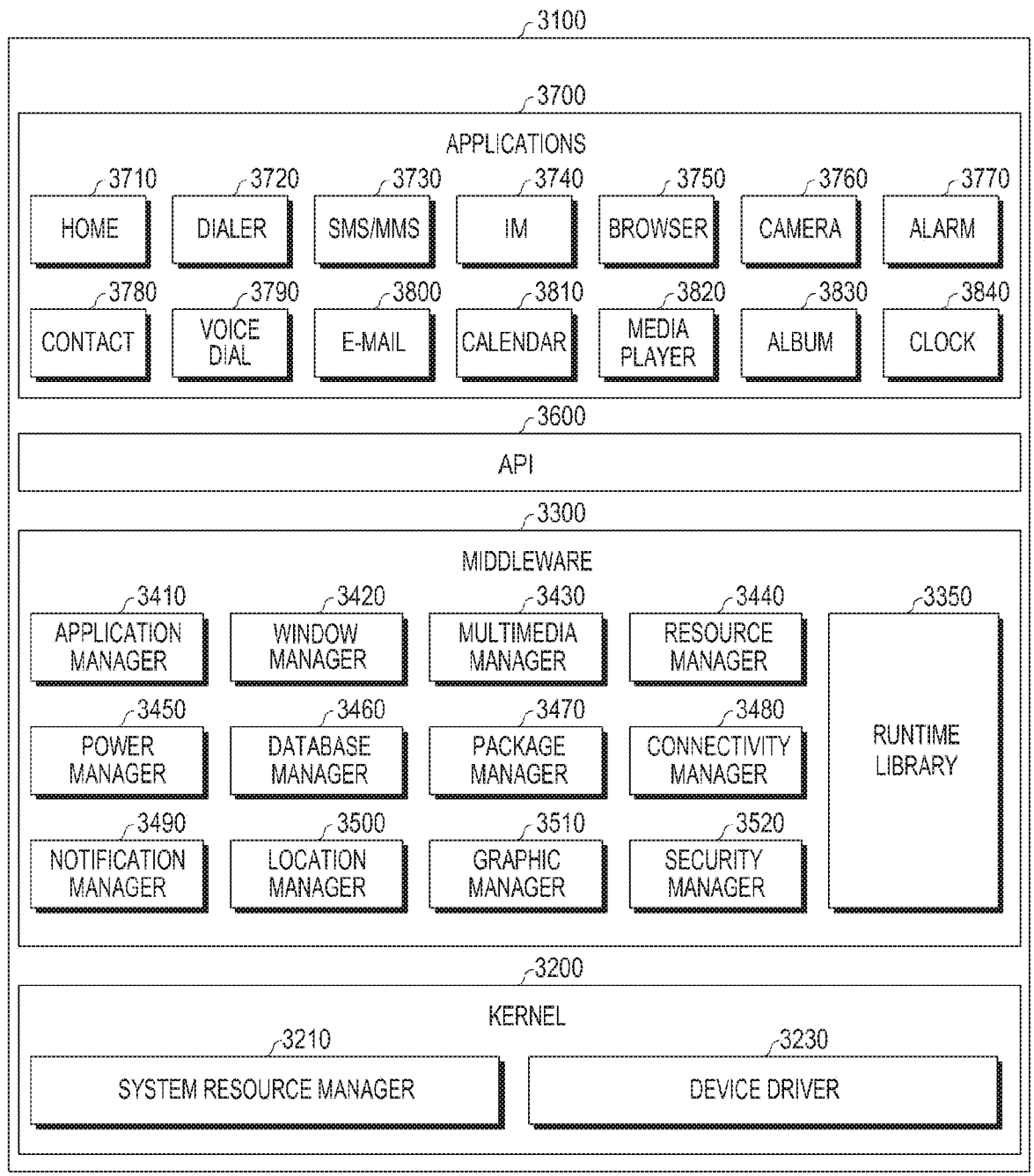
FIG. 20 is a block diagram illustrating a program module according to various embodiments.

FIG. 20 is a block diagram illustrating a program module according to various embodiments. According to one embodiment, a program module 3100 (e.g., the program 1400) may include an Operating System (OS) that controls resources associated with an electronic device (e.g., the electronic device 1010) and/or various applications (e.g., the application program 1470) that are driven on the operating system. The operating system may be, for example, Android, iOS, Windows, Symbian, Tizen, or Bada.

The program module 3100 may include a kernel 3200, a middleware 3330, an Application Programming Interface (API) 360, and/or an application 3700. At least a part of the program module 3100 may be preloaded on the electronic device, or may be downloaded from an external electronic device (e.g., the device 1020 or 1040, or the server 1060).

The kernel 3200 (e.g., the kernel 1410) may include, for example, a system resource manager 3210 and/or a device driver 3230. The system resource manager 3210 may perform, for example, a control, allocation, or recovery of a system resource. According to one embodiment, the system resource manager 3210 may include, for example, a process management unit, a memory management unit, or a file system management unit. The device driver 3230 may include, for example, a display driver, a camera driver, a Bluetooth driver, a common memory driver, a USB driver, a keypad driver, a Wi-Fi driver, an audio driver, or an Inter-Process Communication (IPC) driver.

The middleware 3330 may provide, for example, a function that is commonly required by the applications 3700, or may provide various functions to the applications 3700 through the API 360 such that the applications 3700 can efficiently use the limited system resources within the electronic device. According to one embodiment, the middleware 3330 (e.g., the middleware 1430) may include at least one of a runtime library 335, an application manager 3410, a window manager 3420, a multimedia manager 3430, a resource manager 3440, a power manager 3450, a database manager 3460, a package manager 3470, a connectivity manager 3480, a notification manager 3490, a location manager 3500, a graphic manager 3510, and a security manager 3520.

The runtime library 335 may include, for example, a library module that is used by a compiler in order to add a new function through a program language while the applications 3700 are executed. The runtime library 335 may perform, for example, input/output management, memory management, or a function for an arithmetic function.

The application manager 3410 may manage, for example, a life cycle of at least one application among the applications 3700. The window manager 3420 may manage a GUI resource that is used in a screen. The multimedia manager 3430 may grasp a format required for reproducing various media files, and may perform encoding or decoding of the media files by using a codec that is suitable for the corresponding format. The resource manager 3440 may manage a resource, such as a source code, a memory, or a storage space, of at least one application among the applications 3700.

The power manager 3450 is operated together with, for example, a Basic Input/Output System (BIOS) so as to manage a battery or a power source, and may provide, for example, power information that is required for operating the electronic device. The database manager 3460 may generate, retrieve, or change a database to be used by at least one application among the applications 3700. The package manager 3470 may manage the installation or update of an application that is distributed in the form of a package file.

The connectivity manager 3480 may manage, for example, a wireless connection of Wi-Fi, Bluetooth, or the like. The notification manager 3490 may display or notify events, such as an arrival message, appointment, and proximity notification in a manner that does not disturb the user. The location manager 3500 may manage position information of the electronic device. The graphic manager 3510 may manage a graphic effect to be provided to the user or a user interface associated therewith. The security manager 3520 may provide all security functions required for, for example, system security, or user authentication. According to one embodiment, in the case where the electronic device (e.g., the electronic device 1010) includes a phone function, the middleware 3330 may include a telephony manager in order to manage a voice or video call function of the electronic device.

The middleware 3330 may include a middleware module that forms a combination of various functions of the above-described components. The middleware 3330 may provide a module that is specialized for each kind of operation system in order to provide differentiated functions. In addition, the middleware 3330 may dynamically delete some of the existing components or add new components.

The API 360 (e.g., the API 1450) is, for example, a collection of API programming functions, and may be provided in different configurations according to operation systems. For example, Android or iOS may provide one API set for each platform and Tizen may provide two or more API sets for each platform.

The applications 3700 (e.g., the application program 1470) may include, for example, one or more applications that can execute, for example, the functions of home 3710, dialer 3720, SMS/MMS 3730, Instant Message (IM) 3740, browser 3750, camera 3760, alarm 3770, contact 3780, voice dial 3790, e-mail 3800, calendar 3810, media player 3820, album 3830, and watch 3840, health care (e.g., measurement of a quantity of motion, or blood sugar), or provision of environmental information (e.g., provision of atmospheric pressure, humidity, or temperature information).

According to one embodiment, the applications 3700 may include an application that supports information exchange between the electronic device (e.g., the electronic device 1010) and the external electronic devices (e.g., the electronic devices 1020 and 1040) (hereinafter, the application will be referred to as an "information exchange application" for the convenience of description). The information exchange application may include, for example, a notification relay application to transmit specific information to the external electronic devices, or a device management application to manage the external electronic devices.

For example, the notification relay application may include a function of relaying notification information generated from any other application of the electronic device (e.g., an SMS/MMS application, an e-mail application, a healthcare application, or an environment information application) to the external electronic devices (e.g., the electronic devices 1020 and 1040). In addition, the notification relay application may receive notification information from, for example, an external electronic device, and may provide the notification information to the user.

The device management application may manage (e.g., install, delete, or update) at least one function of an external electronic device (e.g., the electronic device 1020 or 1040) that communicates with the electronic device (e.g., turn-on/turn-off of the external electronic device itself (or some components thereof) or adjustment of brightness (or resolution) of a display), an application operated in the external electronic device, or a service provided by the external electronic device (e.g., a telephony service or a message service).

According to one embodiment, the applications 3700 may include an application designated according to an attribute of an external electronic device (e.g., the electronic device 1020 or 1040) (e.g., a healthcare application of a mobile medical device). According to one embodiment, the applications 3700 may include an application received from an external electronic device (e.g., the server 1060 or the electronic device 1020 or 1040). According to one embodiment, the applications 3700 may include a preloaded application or a third-party application that is capable of being downloaded from the server. The names of the components of the program module 3100 according to the illustrated embodiment may vary depending on the kind of operation system.

According to various embodiments, at least a portion of the program module 3100 may be implemented by software, firmware, hardware, or a combination of two or more thereof. At least a portion of the program module 3100 may be implemented (e.g., executed) by, for example, a processor (e.g., the processor 210). At least a portion of the program module 3100 may include, for example, a module, a program, a routine, a set of instructions, or a process for performing one or more functions.

Although the embodiments as described herein and shown in the drawings are merely provided to easily explain the technical contents of the present disclosure and help the understanding thereof, they are not intended to limit the scope of the present disclosure. Therefore, it should be construed that, in addition to the embodiments disclosed herein, all modifications and changes or modified and changed forms derived from the technical idea of various embodiments of the present disclosure fall within the scope of the present disclosure.

The invention claimed is:

1. An antenna device comprising:
a transparent film member;
a transparent coil member provided on at least one face of the transparent film member; and
a connection circuit board including connection coils and connection lines and connected to the transparent coil member such that the connection circuit board and the transparent coil member forms a closed loop circuit,
wherein at least a part of the transparent film member and at least a part of the transparent coil member are disposed in a display region and at least a part of the connection circuit board is disposed in a non-display region such that the antenna device formed in both the display region and the non-display region,
wherein the transparent coil member comprises:
a first transparent coil member implemented for a first frequency band; and
a second transparent coil member disposed along a periphery of the first transparent coil member, and implemented for at least one second frequency band that is different from the first frequency band, and
wherein each of the first transparent coil member and the second transparent coil member forms the closed loop circuit by using a single wound coil.

2. The antenna device of claim 1, wherein the first transparent coil member and the second transparent coil member are disposed in a single layer on one face of the transparent film member.

3. The antenna device of claim 2, wherein the first transparent coil member comprises:

a first coil portion wound at least one direction;

a first input terminal provided in one end of the first coil portion such that current is input to first input terminal; and a first output terminal provided in a remaining end of the first coil portion such that the current input to the first input terminal is output through the first output terminal.

4. The antenna device of claim 3, wherein the second transparent coil member comprises:

a second coil portion wound along a periphery of the first coil portion;

a second input terminal provided in one end of the second coil portion such that current is input to the second input terminal; and a second output terminal provided in a remaining end of the second coil portion such that the current input to the second input terminal is output through the second output terminal.

5. The antenna device of claim 4, wherein at least one lumped element is mounted on a side of the first output terminal or the second output terminal.

6. The antenna device of claim 1, wherein the first transparent coil member and the second transparent coil member are disposed in multiple layers on one face and another face of the transparent film member.

7. The antenna device of claim 6, wherein the first transparent coil member comprises:

a first coil portion wound on one face of the transparent film member;

a second coil portion connected to the first coil portion, and wound on the another face of the transparent film member;

a first input terminal provided in one end of the first coil portion or one end of the second coil portion, and configured to input current to the first coil portion or the second coil portion;

a first output terminal provided at a remaining end of the first coil portion or a remaining end of the second coil portion, and configured to output current to the first coil portion or the second coil portion; and a first connection portion configured to connect one of the one end and the remaining end of the first coil portion and one of the one end and the remaining end of the second coil portion to each other.

8. The antenna device of claim 7, wherein at least one lumped element is mounted on a side of the first output terminal.

9. The antenna device of claim 7, wherein the second transparent coil member comprises:

a third coil portion wound along the periphery of the first coil portion on the one face of the transparent film member;

a fourth coil portion wound along the periphery of the second coil portion on the another face of the transparent film member;

a second input terminal provided at one end of the third coil portion or one end of the fourth coil portion such that current is input to the second input terminal;

a second output terminal provided at a remaining end of the third coil portion or a remaining end of the fourth coil portion such that current is output through the second output terminal; and a second connection portion configured to connect one of the one end and the remaining end of the third coil portion and one of the one end and the remaining end of the fourth coil portion to each other.

10. The antenna device of claim 9, wherein at least one lumped element is mounted on a side of the second output terminal.

11. An electronic device comprising:

a display including a display region and a non-display region;

a transparent film member provided as at least one panel of the display; and an antenna device disposed in the display region and the non-display region, wherein the antenna device comprises:

the transparent film member; and a transparent coil member provided on at least one face of the transparent film member, and a connection circuit board including connection coils and connection lines and connected to the transparent coil member such that the connection circuit board and the transparent coil member forms a closed loop circuit, wherein at least a part of the transparent film member and at least a part of the transparent coil member are disposed in the display region and at least a part of the connection circuit board is disposed in the non-display region such that the antenna device formed in both the display region and the non-display region, wherein the transparent coil member comprises:

a first transparent coil member implemented for a first frequency band; and a second transparent coil member disposed along a periphery of the first transparent coil member, and implemented for at least one second frequency band that is different from the first frequency band, and wherein each of the first transparent coil member and the second transparent coil member forms the closed loop circuit by using a single wound coil.

* * * * *